(12) United States Patent  (10) Patent No.: US 7,868,921 B2
Hattori  (45) Date of Patent: Jan. 11, 2011

(54) IMAGE PROCESSING FILE SETTING SYSTEM

(75) Inventor: Mitsuaki Hattori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1149 days.

(21) Appl. No.: 11/356,110

(22) Filed: Feb. 17, 2006

(65) Prior Publication Data
US 2007/0195350 A1 Aug. 23, 2007

(51) Int. Cl.
H04N 5/235 (2006.01)
H04N 9/73 (2006.01)

(52) U.S. Cl. .................. 348/222.1; 348/224.1

(58) Field of Classification Search ............ 348/222.1, 348/224.1
See application file for complete search history.

(56) References Cited

U.S. PATENT DOCUMENTS

| | | | | |
|---|---|---|---|---|
| 6,035,323 | A * | 3/2000 | Narayen et al. ............. | 709/201 |
| 6,750,902 | B1 * | 6/2004 | Steinberg et al. ......... | 348/211.3 |
| 6,774,935 | B1 * | 8/2004 | Morimoto et al. ........ | 348/211.5 |
| 7,456,867 | B2 * | 11/2008 | Yamada ................... | 348/222.1 |
| 7,633,523 | B2 * | 12/2009 | Toyoda et al. ............ | 348/207.1 |
| 2003/0090690 | A1 * | 5/2003 | Katayama et al. ............ | 358/1.9 |
| 2006/0103737 | A1 * | 5/2006 | Okisu et al. ............... | 348/222.1 |

FOREIGN PATENT DOCUMENTS

| JP | 2002-344799 A | 11/2002 |
|---|---|---|
| JP | 2003-264735 A | 9/2003 |
| JP | 2003-333417 | 11/2003 |
| JP | 2004-088437 A | 3/2004 |

OTHER PUBLICATIONS

Office Action for corresponding Japanese Application No. 2006-041659 issued Jul. 12, 2010.

* cited by examiner

*Primary Examiner*—Lin Ye
*Assistant Examiner*—Amy Hsu
(74) *Attorney, Agent, or Firm*—Fitzpatrick, Cella, Harper & Scinto

(57) ABSTRACT

A system setting an image processing parameter in an imaging apparatus and an information processing apparatus, downloads a parameter file from an external apparatus, and sets in the imaging apparatus an image processing parameter included in the parameter file downloaded from the external apparatus. In the information processing apparatus, image data is processed using the image processing parameter included in the parameter file. Thus, the information processing apparatus and the imaging apparatus can perform image processing using an image processing parameter obtained from one downloaded parameter file.

14 Claims, 27 Drawing Sheets

FIG. 3

| BEFORE ENCODING | | AFTER ENCODING | | BEFORE DECODING | | AFTER DECODING |
|---|---|---|---|---|---|---|
| | +5 | | | | −5 | |
| 0 | → | 5 | | 0 | → | B |
| 1 | → | 6 | | 1 | → | C |
| 2 | → | 7 | | 2 | → | D |
| 3 | → | 8 | | 3 | → | E |
| 4 | → | 9 | | 4 | → | F |
| 5 | → | A | | 5 | → | 0 |
| 6 | → | B | | 6 | → | 1 |
| 7 | → | C | | 7 | → | 2 |
| 8 | → | D | | 8 | → | 3 |
| 9 | → | E | | 9 | → | 4 |
| A | → | F | | A | → | 5 |
| B | → | 0 | | B | → | 6 |
| C | → | 1 | | C | → | 7 |
| D | → | 2 | | D | → | 8 |
| E | → | 3 | | E | → | 9 |
| F | → | 4 | | F | → | A |

ENCODING METHOD WHEN ENCODING CONSTANT IS 5

DECODING METHOD WHEN ENCODING CONSTANT IS 5

FIG. 11

IMAGE PROCESSING FILE SETTING SYSTEM

FIELD OF THE INVENTION

The present invention relates to setting of image processing data when image data photographed by an imaging apparatus is processed.

BACKGROUND OF THE INVENTION

Some imaging apparatuses, such as digital cameras, are provided with image processing modes and photometric modes optimized for each photographed scene, such as a landscape photographing mode and a portrait photographing mode. For example, in the aforementioned landscape photographing mode, image processing is carried out with color reproduction such that the blue sky or green is more vividly reproduced, and in the portrait photographing mode, image processing is carried out with color reproduction such that the skin color of a person is clearly reproduced. By making a selection from these photographing modes provided in the imaging apparatus, a user can obtain an image subjected to processing optimized for each scene.

However, for such photographic processing modes, new modes are constantly developed, and new types of imaging apparatuses based on the new modes are sold. As a result, an imaging apparatus which has been just purchased soon becomes a functionally inferior, old-fashioned apparatus.

For solving the problem, a file (control program) for a new photographic processing mode is downloaded from a client server via a communication line and set in an imaging apparatus as in, for example, Japanese Patent Application Laid-Open No. 2003-333417. For the imaging apparatus provided with this function, the user downloads a file for a new photographing mode and sets the file in the imaging apparatus after purchasing the imaging apparatus, whereby a photograph can easily be taken with an updated photographing mode.

Aside from the aforementioned technique, a configuration in which a RAW image (raw data image output from an imaging device) photographed by an imaging apparatus is developed on a personal computer by using a dedicated development application. In the development of an image on the personal computer, a photographing mode such as a scene or portrait mode can be selected to develop an image in the same manner as in the imaging apparatus in some cases.

However, for the technique proposed in Japanese Patent Application Laid-Open No. 2003-333417, a file set in a digital camera is described, but setting of the file in the development application is not mentioned. Therefore, image processing according to a photographing mode set in a digital camera cannot be reproduced by development application software.

SUMMARY OF THE INVENTION

The present invention has been made in view of the problem described above, and its object is to make an image processing parameter downloaded from an external apparatus settable in both an imaging apparatus and a development application.

According to one aspect of the present invention, there is provided a system for setting a parameter for image processing in an imaging apparatus and an information processing apparatus, comprising: a downloading unit configured to download a parameter file from an external apparatus; a setting unit configured to set in the imaging apparatus an image processing parameter included in the parameter file downloaded by the downloading unit; and a processing unit configured to process image data using the image processing parameter included in the parameter file in the information processing apparatus. The information processing apparatus and the imaging apparatus are capable of performing image processing using the image processing parameter obtained from one parameter file downloaded by the downloading unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of encoding and decoding of the image processing parameter file in the first embodiment;

FIG. 11 shows an example of a specific display screen of the setting application 101*b* in the first and second embodiments;

DETAILED DESCRIPTION OF THE PREFERRED EMBODIMENTS

Preferred embodiments of the present invention will now be described in detail in accordance with the accompanying drawings.

First Embodiment

Figure 1:
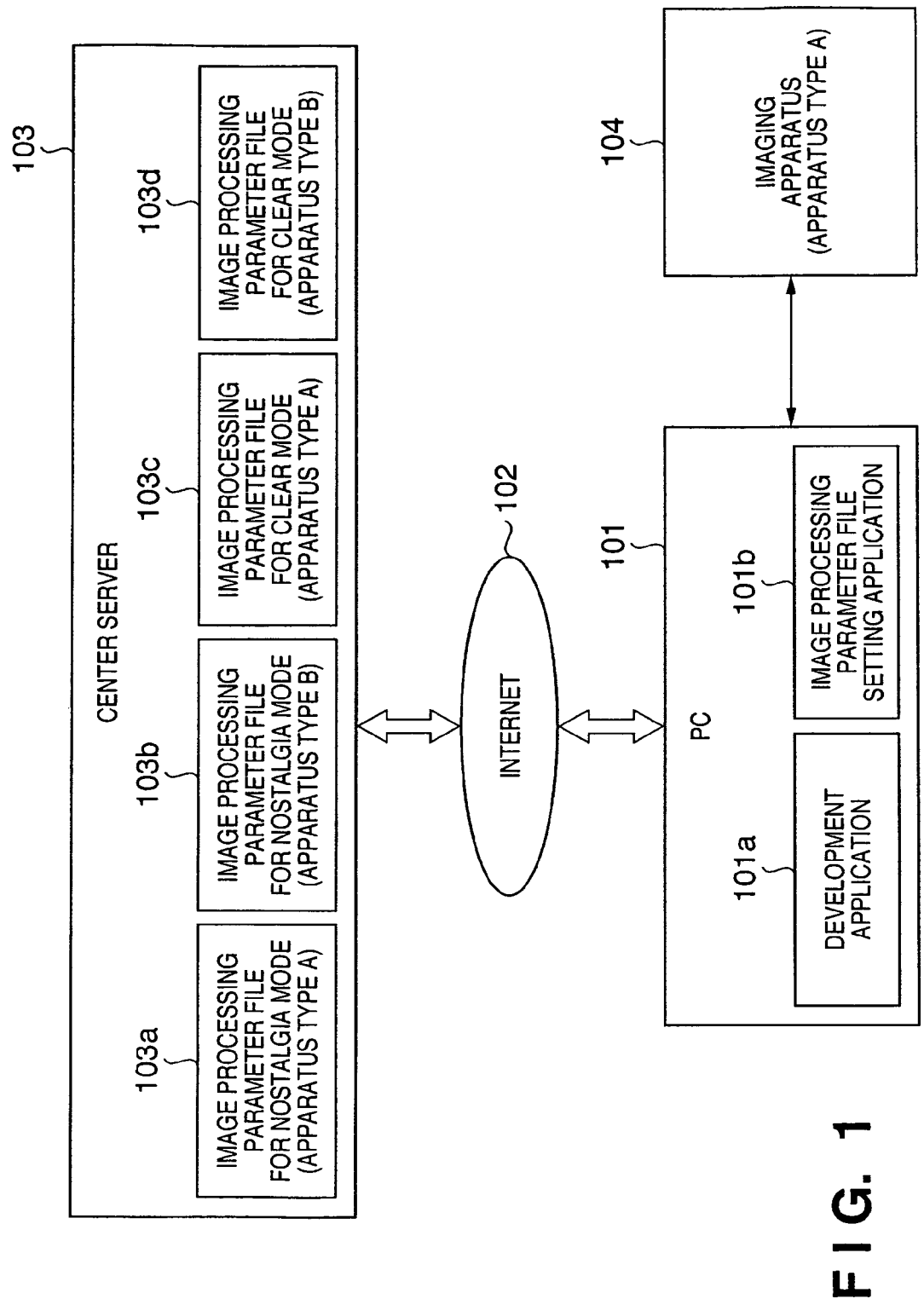
FIG. 1 shows a schematic block diagram of an image processing file setting system in a first embodiment.

FIG. 1 shows an outline of an image processing parameter setting system in a first embodiment.

In FIG. 1, a center server 103 is provided to be connectable to the internet 102. A user can access the center server 103 by connecting a home personal computer 101 (hereinafter referred to as PC) to the internet 102 via a Web browser. A communication line, an internet provider and the like are not shown in the figure. The PC 101 can be connected to an imaging apparatus 104, such as a digital camera, through a communication cable, such as a USB. In this embodiment, the imaging apparatus 104 is denoted as an apparatus type A, but a different type of imaging apparatus can be connected to the PC 101. As shown in FIG. 1, a development application 101a for developing a RAW image photographed by the imaging apparatus 104 is installed in the PC 101.

An image processing parameter file, in which an image processing parameter settable in the imaging apparatus 104 and the development application 101a is recorded, is recorded in the center server 103. By setting a parameter recorded in the image processing parameter file in the imaging apparatus 104 and the development application 101a, the user can obtain an image processed (developed) with an image processing characteristic of the parameter.

For example, there is a "nostalgia mode" for nostalgically depicting a person or a landscape by making the color generally light with only the saturation of yellow intensified. Alternatively, there is an image processing file corresponding to an image processing characteristic such as a "clear mode" for forming an image of high contrast even if a photograph is taken with white and hazy sky or sea in the background. In this embodiment, such an image processing characteristic is called an "image style".

The image processing parameter file is prepared for each type of the imaging apparatus 104. For example, an image processing parameter file 103a for the nostalgia mode and an image processing parameter file 103c for the clear mode, which correspond to the imaging apparatus of apparatus type A, are registered in the center server 103 shown in FIG. 1. Similarly, an image processing parameter file 103b for the nostalgia mode and an image processing parameter file 103d for the clear mode, which correspond to the imaging apparatus of apparatus type B, are registered. Files corresponding to two types of imaging apparatuses are prepared in this embodiment, but the number of apparatus types is not limited. For the type of image style, the nostalgia mode and the clear mode are prepared, but the number of types is not limited.

An image processing parameter file is newly developed, and added to the center server, whereby the user can download and use the new image processing parameter. Thus, the user can carry out image processing by an updated image style on every occasion after purchasing the imaging apparatus.

Image processing parameter file setting application software 101b (hereinafter referred to as setting application 101b) for setting an image processing parameter file in the imaging apparatus 104 is installed in the PC 101. The setting application 101b stores in the PC 101 an image processing parameter file downloaded from the center server 103, and registers in the imaging apparatus 104 an image style specified by the image processing parameter file.

Figure 2:
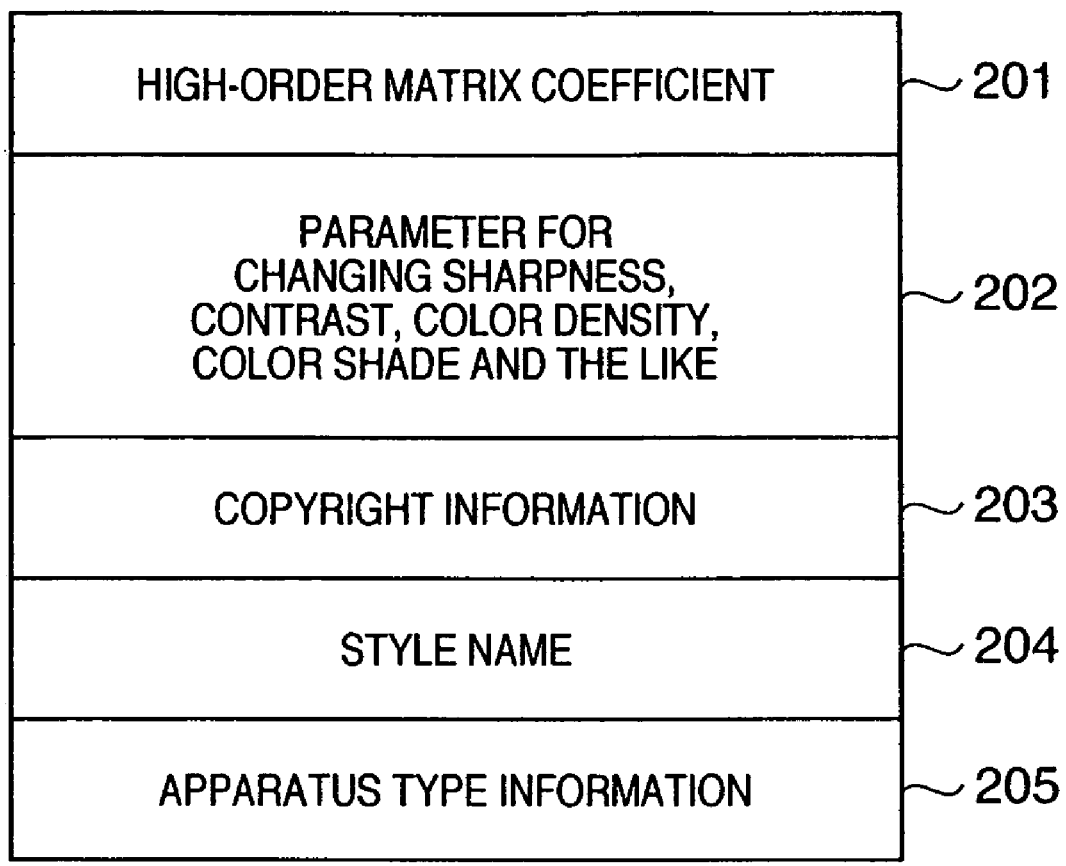
FIG. 2 shows an example of a data structure of an image processing parameter file in the first embodiment.

Details of contents of the image processing parameter file will now be described. FIG. 2 shows an example of a data configuration of the image processing parameter file according to this embodiment.

As shown in FIG. 2, the image processing parameter file includes a high-order matrix coefficient 201 for specifying image processing. A three-dimensional LUT (lookup table) may be used in place of the matrix coefficient. The setting of contents of image processing by the high-order matrix coefficient or the three-dimensional LUT will be described later. In addition, the image processing parameter file includes an adjustment parameter 202 for finely adjusting the sharpness, the contrast, the color density, the color shade and the like in image processing by the imaging apparatus 104 and the development application 104a. The contents of the adjustment parameter 202 can be changed by the user as described later. The image processing parameter file also includes copyright information 203 for certifying the copyright of the image processing parameter file. In this copyright information 203, an ID representing the name of a person or company having the copyright of the image processing parameter file is described. In addition, the image processing parameter file includes a style name 204 such as "nostalgia" or "clear" and apparatus type information 205 of the corresponding imaging apparatus. The style name 204 is presented to the user as the name of a photographing mode.

Data involved in image processing, such as the high-order matrix coefficient 201 and the adjustment parameter 202 for changing the sharpness, the contrast, the color density, the color shade and the like in the image processing parameter file is preferably encoded before being prepared in the center server 103 so that the data is not easily manipulated. The encoding is performed by, for example, the following method. Data in the file is divided for every 4 bits and encoded. Data which can be taken before being encoded is 0 to F on a hexadecimal basis, but a predetermined encoding constant is added thereto, and the resultant data is determined to be encoded data. Namely, data is encoded using the equation (1) shown below.

pre-encoding data+encoding constant=encoded data (1)

Data encoded in the manner described above is decoded immediately before it is set in the imaging apparatus described later or used in the development application 101a. Specifically, as shown in the following equation (2), encoded data can be decoded by subtracting the encoding constant from the data.

encoded data−encoding constant=decoded data (2)

FIG. 3 shows an example of the encoding and decoding when the encoding constant is 5. However, the encoding constant is not limited to 5 although it is 5 in this embodiment. In addition, data may be encoded by a method different from the encoding described above as a matter of course. Part of the image processing parameter file (high-order matrix coefficient 201, and adjustment parameter 202 in the example described above) is encoded in this embodiment, but the entire file may be encoded.

The configurations of the PC 101 and the imaging apparatus 104 capable of carrying out imaging processing using the aforementioned high-order matrix coefficient and adjustment parameter according to this embodiment will now be described.

Figure 4:
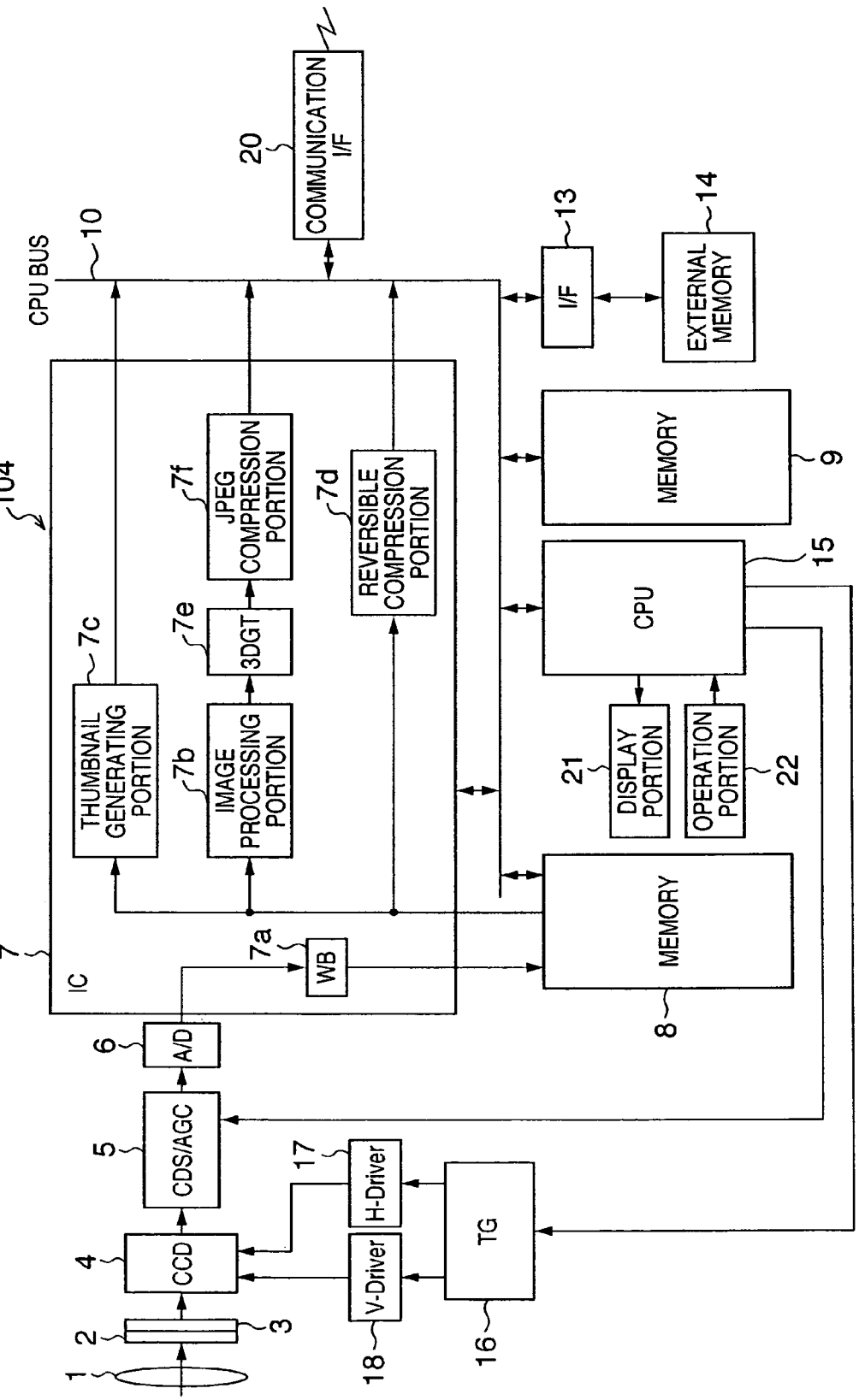
FIG. 4 is a block diagram showing an example of a general configuration of an imaging apparatus 104 in the first embodiment.

FIG. 4 is a block diagram showing the configuration of the imaging apparatus (digital camera) according to the first embodiment. In FIG. 4, light which has passed a photographing lens 1 passes through an infrared cut filter 2 and an optical LPF 3 and is imaged onto an imaging device 4. The imaging device 4 is a CCD and CMOS sensor or the like. Generally, sensors comprising photodiodes are two-dimensionally placed on the light receiving surface of the imaging device 4. For example, for a color filter in which primary color filters of R (red), G (green) and B (blue) are placed in a predetermined arrangement, one color is assigned to each sensor. Alternatively, as many imaging devices 4 as primary colors may be prepared so that each color is assigned to each imaging device.

Light imaged onto the imaging device 4 is converted into an amount of electric charge consistent with the amount of light incident on each sensor. Signals generated by a timing generator 16 are supplied to a horizontal driving driver 17 and a vertical driving driver 18. The horizontal driving driver 17 and the vertical driving driver 18 supply drive signals to the imaging device 4 in accordance with signals from the timing generator 16. In accordance with the drive signals, electric charges accumulated on the sensor from the imaging device 4 are transmitted and sequentially converted into voltage signals.

Each converted voltage signal is sampled and gain-adjusted by a correlated double sampling/gain adjusting portion 5 (hereinafter referred to as CDS/AGC), and converted into a digital signal by an A/D converter 6. Image data converted into the digital signal by the A/D converter 6 is input to an image processing IC 7. In the image processing IC 7, a WB circuit 7a calculates data for white balance for the input image data. The data for white balance and the image data are stored in a memory 8 on a temporary basis.

The image data stored in the memory 8 is input to the image processing IC 7 again, and the following three processes are carried out.

(1) Image data converted into a digital signal is directly subjected to lossless compression (reversible compression) in a reversible compressing portion 7d, and sent to a CPU bus 10 as RAW data.

(2) Image data converted into a digital signal is changed into a thumbnail image having a size smaller than the original image size by down sampling such as thinning processing in a thumbnail generating portion 7c, and sent to the CPU bus 10. In thinning processing, RAW image data is divided into a plurality of blocks, and the divided data is averaged in each block, whereby down sampling is performed.

(3) An image to be subjected to JPEG compression is created. For this purpose, an image processing portion 7b of an imaging apparatus 104 first subjects image data to image processing. Processing in the image processing portion 7b includes well known processing such as white balance processing, color interpolation, masking processing, gamma conversion and edge enhancement. At least part of an adjustment parameter 202 acts on the image processing portion 7b. Image data output from the image processing portion 7b is converted by a three-dimensional lattice point data table 7e based on a high-order matrix coefficient 201. The converted image data is subjected to raster block conversion and subjected to JPEG compression in a JPEG compression portion 7f, and is sent to the CPU bus 10.

Hereinafter, the three-dimensional lattice point data table is referred to as a three-dimensional lookup table. In the three-dimensional lookup table, color conversion processing is carried out, but the details of color conversion processing using the three-dimensional lookup table are well known, and therefore explanations thereof are not presented herein. By setting the three-dimensional lookup table, a desired color can be converted into a desired color (e.g. the sky blue can be converted into a desired blue color).

RAW data subjected to reversible compression and image data subjected to JPEG compression are each stored in a memory 9 by way of the CPU bus 10. A CPU 15 generates a RAW image file with a JPEG-compressed image attached to RAW data stored in the memory 9. The JPEG-compressed image is attached as data for preview of RAW data. The generated RAW image file is stored in an external memory 14 (e.g. a memory card such as compact flash card (CF card)) detachably connected via an interface 13.

A communication I/F 20 is an interface for communicating with an external apparatus such as the PC 101, and is, for example, constituted by a USB port. A display portion 21 is a liquid crystal panel, and performs a function of presenting various kinds of operation menus, a function of displaying photographed images, and an electronic view finder (EVF) function. An operation portion 22 includes operation switches such as a shutter switch, a mode switch and a cross key.

A control program for performing the aforementioned processing by the CPU 15 is stored in the memory 8 or the memory 9.

The CPU 15 reads high-order matrix coefficients corresponding to a specified photographing mode from high-order matrix coefficients stored in the memory 9 according to a procedure described later. A three-dimensional lookup table 7e is generated based on the read coefficient.

For example, given that a matrix operation is carried out up to a third-order term using a high-order matrix coefficient set of m01 to m19, $$Red = m01 \times R + m02 \times G + m03 \times B + \qquad (3)$$
$$m04 \times R \times R + m05 \times G \times G + m06 \times B \times B + m07 \times R \times G +$$
$$m08 \times R \times B + m09 \times G \times B + m10 \times R \times R \times G +$$
$$m11 \times R \times R \times R + m12 \times R \times R \times R + m13 \times R \times G \times G +$$

$$m14 \times G \times G \times B + m15 \times G \times G \times G + m16 \times R \times B \times B +$$
$$m17 \times G \times B \times B + m18 \times B \times B \times B + m19 \times R \times G \times B$$

Namely, using high-order matrix coefficients m01 to m19 corresponding to the specified photographing mode, R, G and B values of lattice points of the three-dimensional lookup table 7e are substituted into the equation (3) to determine Red values of the lattice points. Similarly, values of Green and Blue are determined for the lattice points. In this way, three-dimensional lattice point data is generated, and the generated data is set in the three-dimensional lookup table 7e. For example, if each of Red, Green and Blue can have a value of 0 to 255, R, G and B values at 9×9×9 lattice points dividing each color into 8 parts are determined and set as the three-dimensional lookup table 7e.

The CPU 15 acquires adjustment parameters corresponding to the specified photographing mode from the memory 9 and sets the adjustment parameter in the image processing portion 7b. By setting the three-dimensional lookup table 7e and the image processing portion 7b according to the high-order matrix and the adjustment parameter, image processing according to a desired image style is carried out.

The high-order matrix coefficient and the adjustment parameter in the image processing parameter file as shown in FIG. 2 are set in the memory 9 of the imaging apparatus 104 by the PC 101. In the memory 9, the style name 204, and the high-order matrix coefficient 201 and the adjustment parameter 202 are registered with the former matched with the latter. The high-order matrix coefficient 201 and the adjustment parameter 202 corresponding to the specified photographing mode (style name) by the operating portion 22 of the imaging apparatus 104 are read from the memory 9, and used for generating the three-dimensional lookup table 7e and setting the image processing portion 7b.

If lattice point data of the three-dimensional lookup table is stored in the image processing parameter file instead of the high-order matrix coefficient, the operation by the equation (3) is not necessary. Namely, lattice point data stored in the image processing parameter file may directly be used as data of the three-dimensional lookup table 7e. Both the high-order matrix coefficient and lattice point data of the three-dimensional lookup table may be registered in the image processing parameter file.

Figure 5:
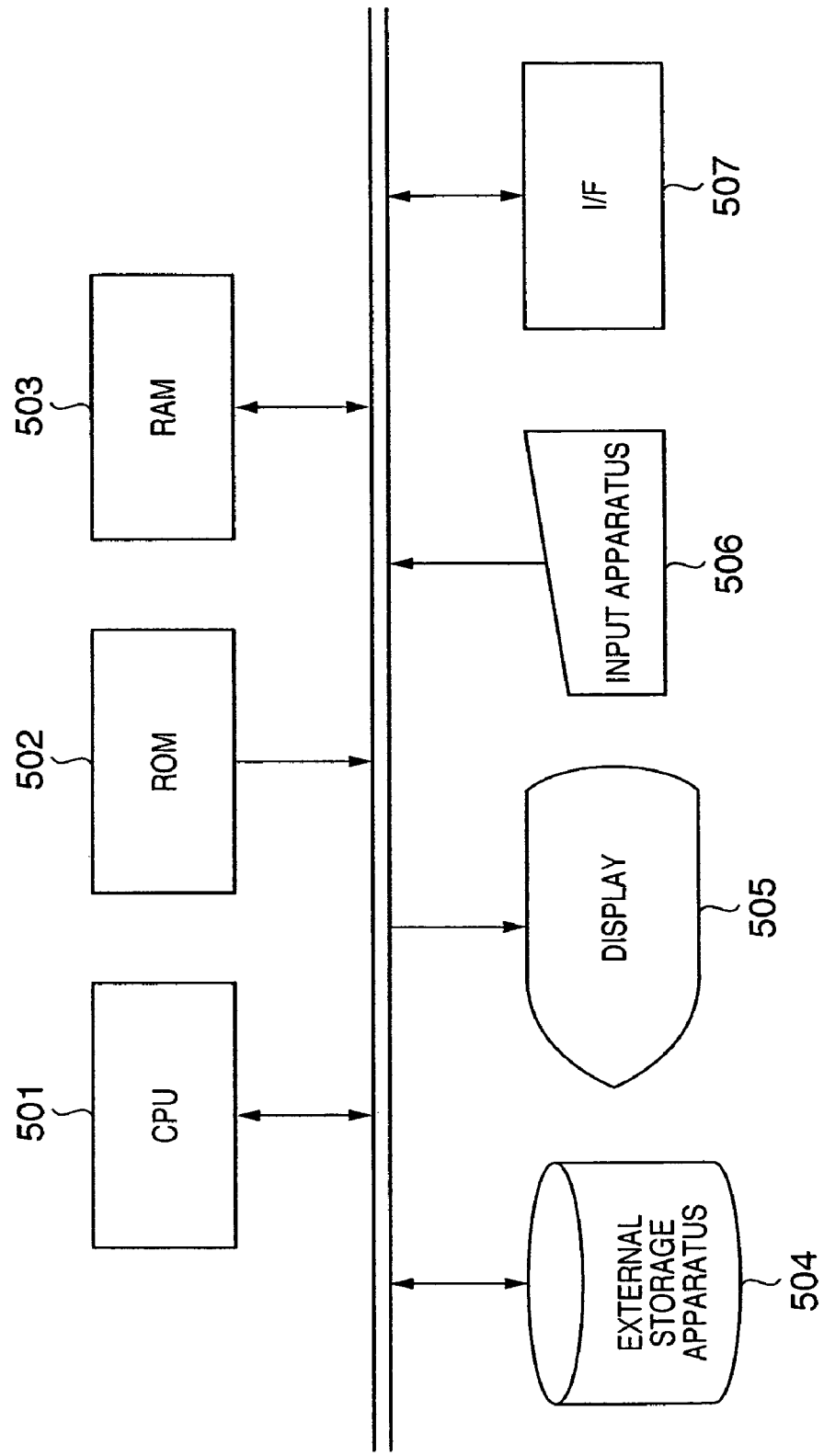
FIG. 5 is a block diagram showing an example of a general configuration of a PC 101 in the first embodiment.

FIG. 5 is a block diagram showing a general configuration of the PC 101. A general personal computer may be used as the PC 101. In FIG. 5, a CPU 501 executes a program held in a ROM 502 or a RAM 503 to perform each processing. The ROM 502 stores a basic input/output system, a boot program and the like in an image processing apparatus. The RAM 503 functions as a main memory of the CPU 501. The RAM 503 is loaded with a program installed in an external storage apparatus 504 for execution by the CPU 501. A display 505 provides various kinds of displays under control by the CPU 501. An input apparatus 506 consists of a keyboard and a pointing device. An interface 507 (hereinafter referred to as I/F 507) makes, for example, the external memory 14 of the digital camera detachably attachable, and can capture in the RAM 503 and the external storage apparatus 504 a RAW image file recorded in the external memory 14. The I/F 507 includes an interface connected to the internet. Further, the I/F 507 includes an interface such as a USB port for achieving connection to the external apparatus, such as the imaging apparatus 104.

Various kinds of applications are installed in the external storage apparatus 504, and loaded into the RAM 507 when executed. The external storage apparatus 504 is generally a hard disk. Applications for processing the RAW image file generated by the digital camera described above will be described below.

Figure 6:
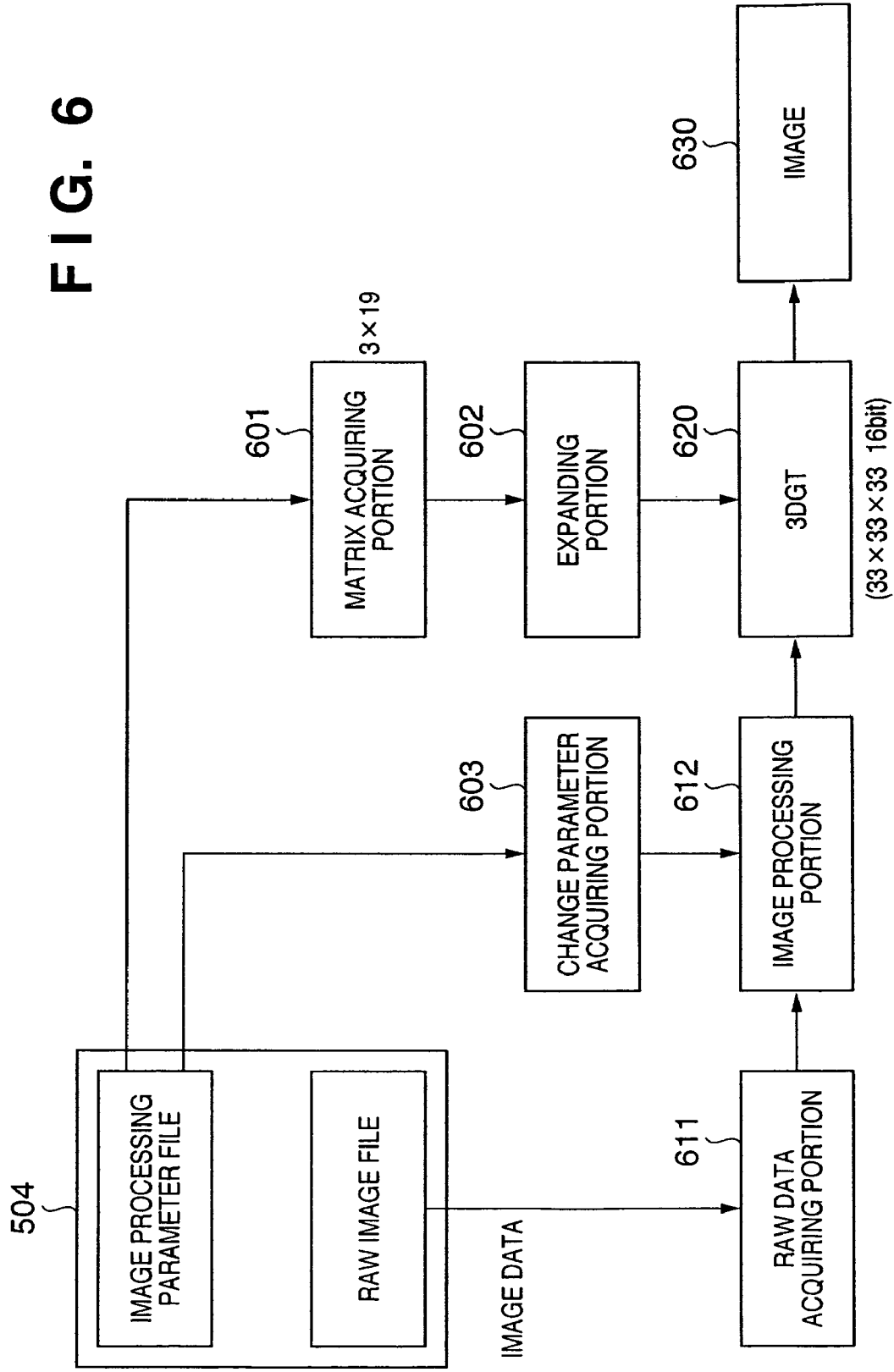
FIG. 6 is a block diagram showing an example of a functional configuration of a development application in the first embodiment.

FIG. 6 is a block diagram showing a functional configuration of the development application 101a executed by the PC 101. The RAW image file generated by the imaging apparatus 104 and the image processing parameter file downloaded from the center server 104 are stored in the external storage apparatus 504. A matrix acquiring portion 601 acquires the high-order matrix coefficient 201 from the image processing parameter file corresponding to a photographing mode (style name) specified by the user. An expanding portion 602 calculates values corresponding to lattice points of a three-dimensional lookup table 620 (three-dimensional lattice point data) using a matrix coefficient set acquired by the matrix acquiring portion 601. Three-dimensional lattice point data is set in the three-dimensional lookup table 620. The expanding portion 602 may generate 9×9×9 lattice point data from a set of 3×19 matrix coefficients as in the imaging apparatus 104. However, the CPU 501 of the PC 101 generally has an enhanced function, and therefore a lookup table having 33×33×33 grids in which each lattice point data includes three 2 bite (16 bit) values may be generated.

A RAW data acquiring portion 611 acquires RAW data from a RAW image file to be processed. An image processing portion 612 subjects the acquired RAW data to processing, such as white balance processing, color interpolation, masking processing, gamma conversion and edge enhancement. Image processing using the three-dimensional lookup table 620 is carried out to obtain a processed image 630. An adjustment parameter acquiring portion 603 acquires adjustment parameters related to the sharpness, the contrast and the like from the image processing parameter file, and sets the acquired adjustment parameters in the image processing portion 612. The processing intensity of edge enhancement and the like in the image processing portion 612 are set according to the adjustment parameter. As is apparent from the explanation described later, apparatus type information of an imaging apparatus which has generated the RAW image file is recorded in the RAW image file, and high-order matrix coefficients and adjustment parameters of the image processing parameter file corresponding to the apparatus type information are used.

In the configuration described above, the PC 101 takes out high-order matrix coefficients and adjustment parameters from image processing parameters downloaded from the center server 103, and sends them to the imaging apparatus 104. The imaging apparatus 104 receives high-order matrix coefficients and adjustment parameters from the PC 101 via the communication I/F 20 and stores them in the memory 9.

Figure 7:
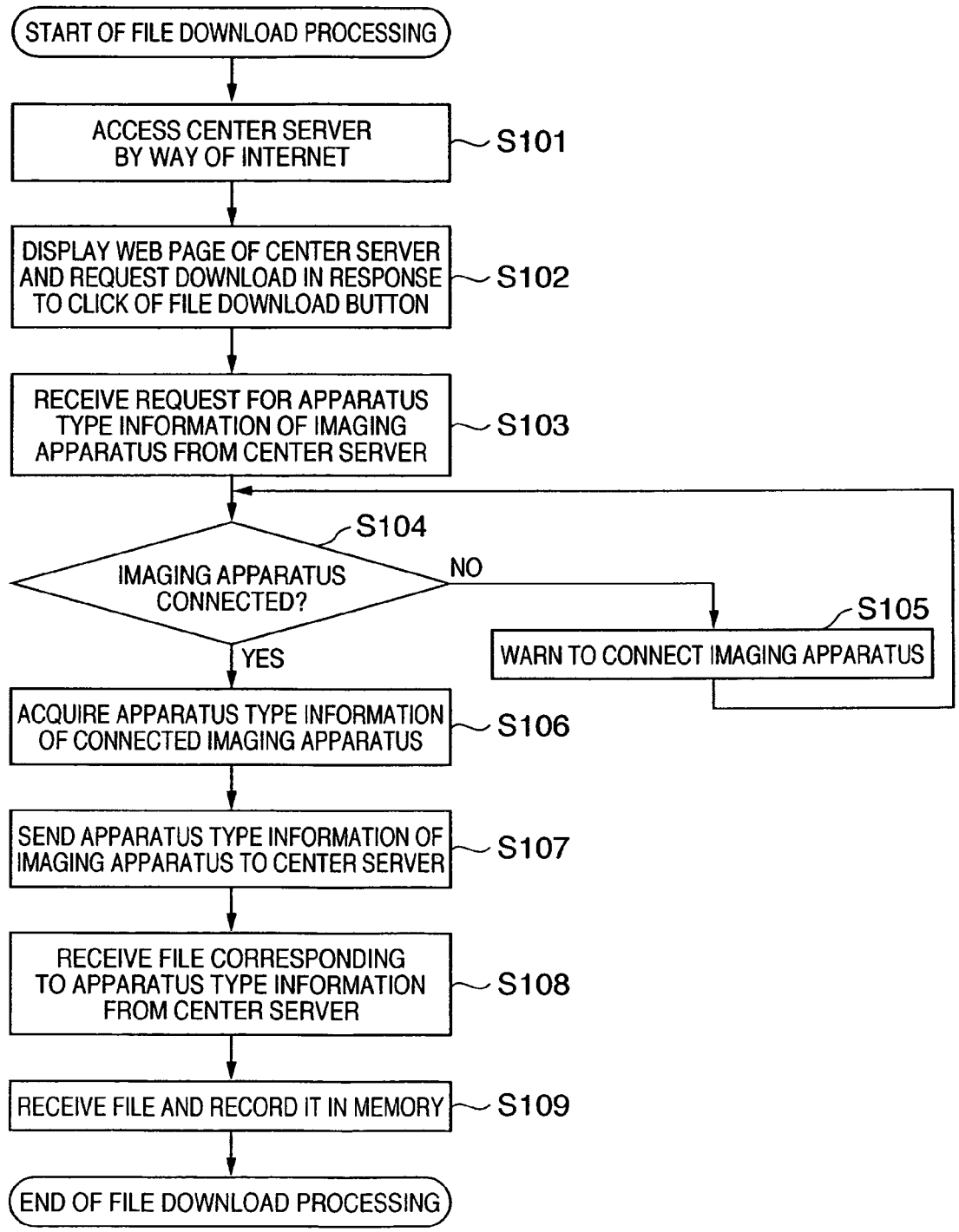
FIG. 7 is a flowchart for explaining processing of downloading the image processing parameter file from a center server in the first embodiment.

Processing of the PC 101 when downloading the image processing parameter file from the center server 103 will now be described with reference to the flowchart of FIG. 7.

First, for downloading the file, the PC 101 establishes a connection to the internet 102 via the I/F 507 by a WEB browser and accesses an image processing parameter file downloading WEB page (not shown) of the center server 103 (step S101). The PC 101 displays the WEB page of the center server 103 on the display 505 (step S102). When an image processing parameter file download button (not shown) prepared on the WEB page is pressed by a user, the PC 101 requests the center server 103 to download the file. The center server 103, which has received the request for downloading, requests apparatus type information of the imaging apparatus from the requesting PC 101. The PC 101 receives a request for apparatus type information of the imaging apparatus from the center server 103 (step S103).

The PC 101 which has received the request for apparatus type information checks whether the imaging apparatus 104 is connected to the PC 101 (step S104), and if it is not connected, the PC 101 displays on the display 505 a warning to connect an imaging apparatus (step S105). The PC 101 waits until the imaging apparatus 104 is connected (step S104).

If it can be confirmed that the imaging apparatus is connected, the PC 101 acquires apparatus type information of the connected imaging apparatus by communication with the connected imaging apparatus (step S106). This embodiment is described based on the premise that the apparatus type A is connected, but the apparatus type is not limited to the apparatus type A. When acquiring apparatus type information, the PC 101 sends the acquired apparatus type information (apparatus type A in this example) to the center server 104 (step S107).

The center server 103 sends to the PC 101 a file corresponding to the received apparatus type information (apparatus type A) among registered image processing parameter files. In FIG. 1, the image processing parameter file 103a for the nostalgia mode and the image processing parameter file 103c for the clear mode are sent to the PC 101. In this way, the PC 101 receives (downloads) from the center server 103 an image processing parameter file corresponding to the connected imaging apparatus (apparatus type A) (step S108). Thus, the image processing parameter file corresponding to the apparatus type of connected imaging apparatus is retrieved on the server side, and downloaded collectively. For the image processing parameter file, the file for the nostalgia mode and the file for the clear mode are shown as an example, but the image processing parameter file is not limited thereto. The number of files is not limited. Alternatively, only an image processing parameter file of a photographing mode specified in the PC 101 may be downloaded.

The PC 101 records in the external storage apparatus 504, such as a hard disk, the image processing parameter file received from the center server 103 (step S109). In this way, processing of downloading the image processing parameter file is completed.

Figure 8:
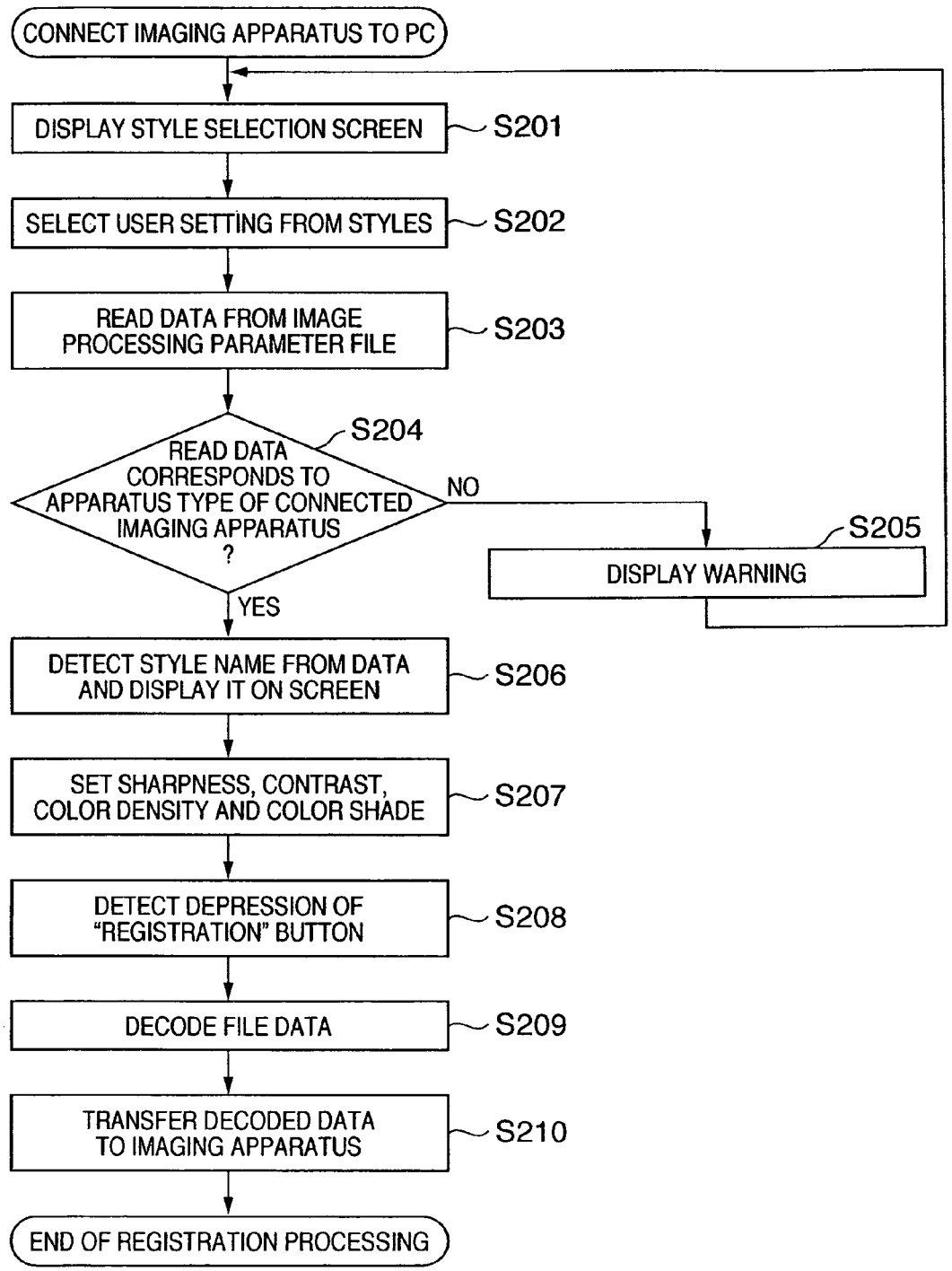
FIG. 8 is a flowchart for explaining processing of a setting application 101*b* for setting the image processing parameter file in the imaging apparatus 104 in the first embodiment.

Processing of setting the image processing parameter file in the imaging apparatus 104 by the setting application 101b will now be described using the flowchart of FIG. 8.

First, when the communication I/F 20 and the I/F 507 of the imaging apparatus 104 are connected to the PC 101 via a communication cable such as a USB cable, the setting application 101b is started in the PC 101. The setting application 101b may be started according to the detection of a connection between the imaging apparatus 104 and the PC 101, or the user may explicitly start the setting application 101b.

Figure 9:
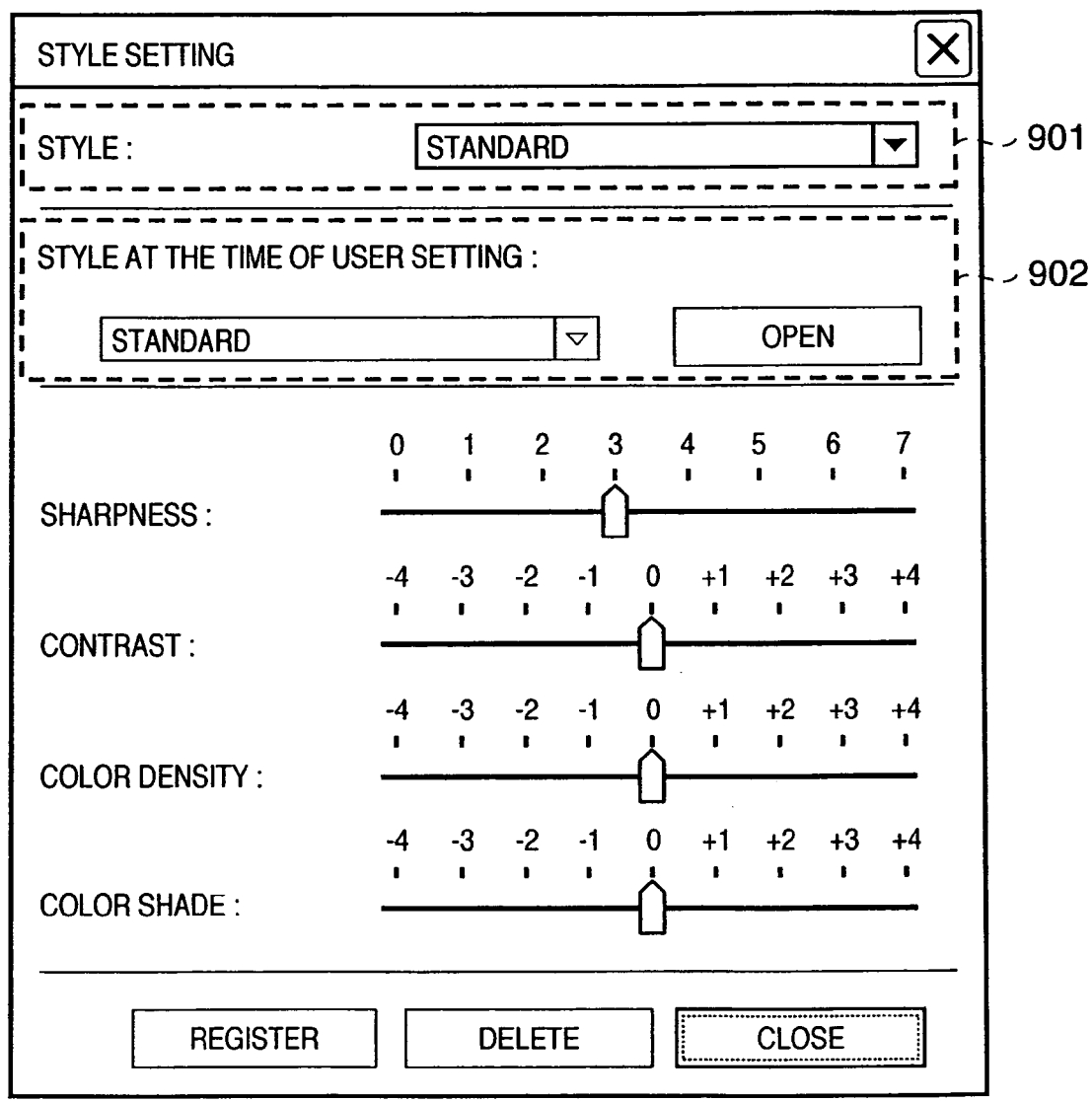
FIG. 9 shows an example of a specific display screen of the setting application 101*b* in first and second embodiments.

The setting application 101b first displays on the display 506 a style selection screen for selecting an image processing parameter (step S201). FIG. 9 shows an example of a specific display screen of the style selection screen by the setting application 101b.

Figure 10:
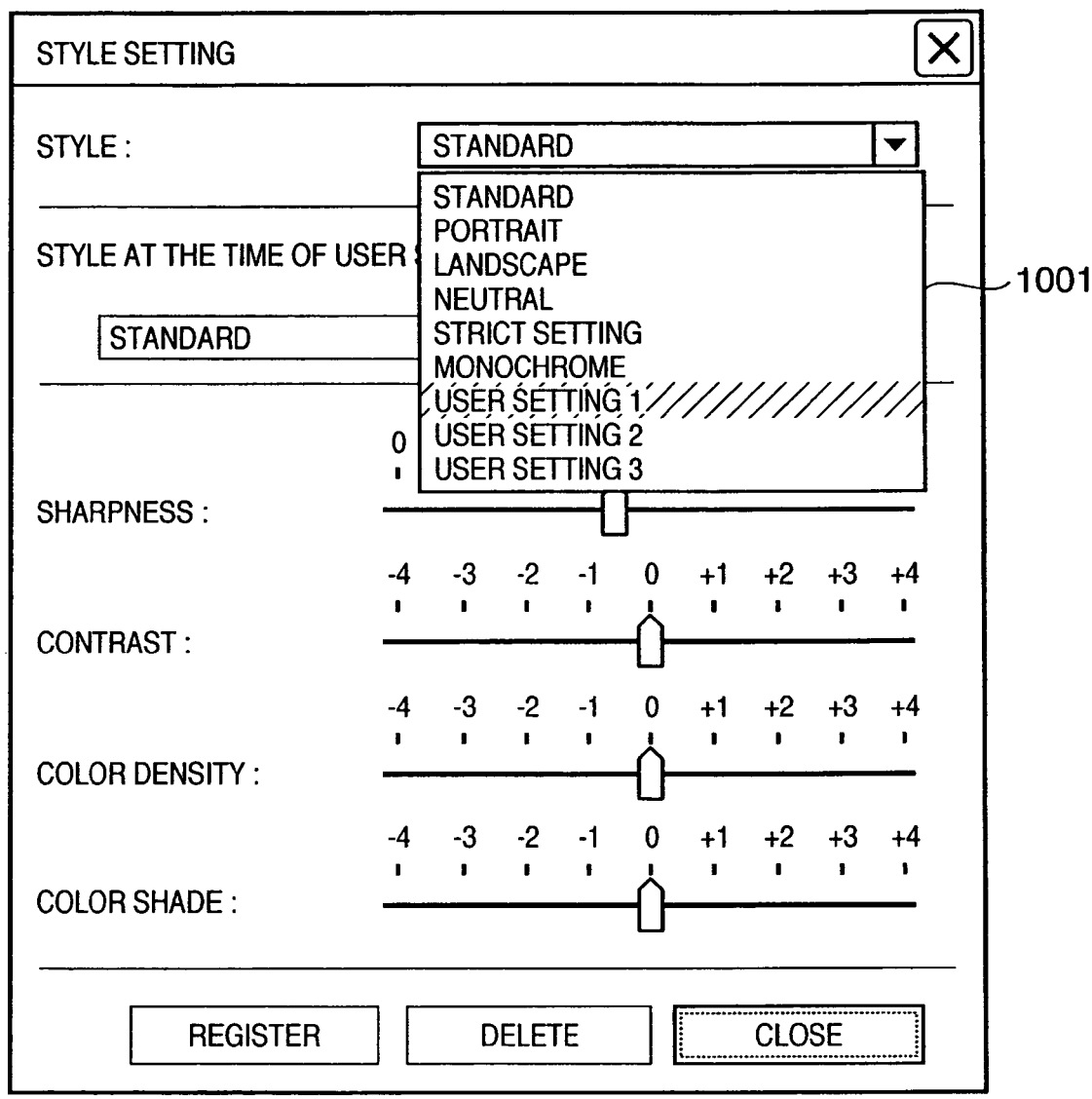
FIG. 10 shows an example of an image style selection screen of the setting application 101*b* in the first and second embodiments.

In FIG. 9, a style selection box 901 is an interface for selecting a style to be set in the imaging apparatus. FIG. 10 shows a situation of style setting by the style selection box 901. By an operation on the style selection box 901, a pull-down list 1001 is displayed as shown in FIG. 10. For the style, modes called standard, portrait, landscape, neutral, strict setting and monochrome are prepared as standard preset modes which can be selected. They are styles having mutually different features. Aside from these styles, there are user setting 1, user setting 2 and user setting 3 as modes for registering data of the image processing parameter file downloaded according to the procedure described with FIG. 7. In this embodiment, three user settings are prepared, and different image processing modes can be registered for the user settings. The number of user settings is not limited to "3". The case where "user setting 1" is selected as shown in FIG. 10 will be described below.

Figure 11:
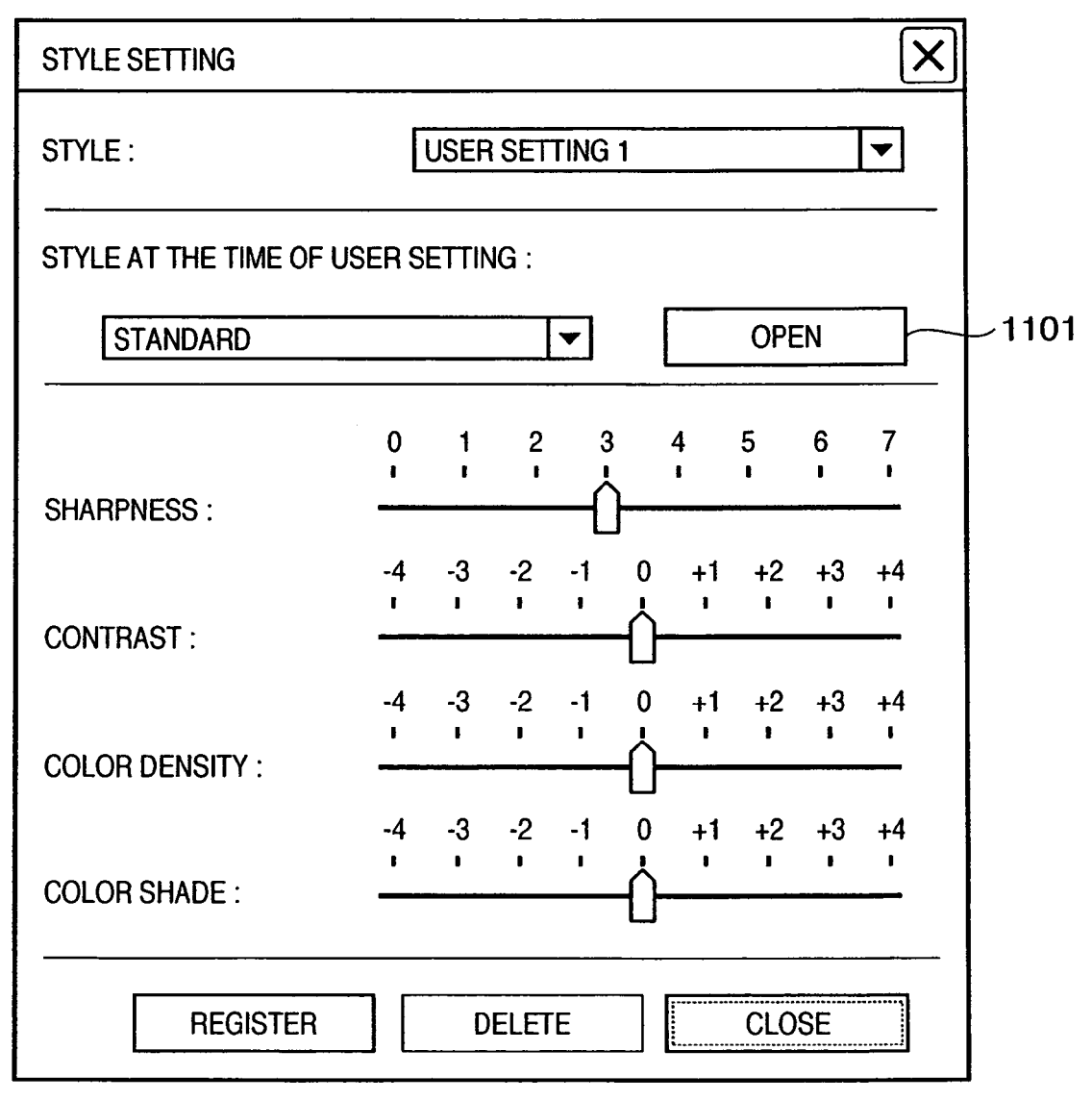

When any one of user settings 1 to 3 is selected (step S202), an area which is grayed out and incapable of being set as shown in a frame 902 of FIG. 9 becomes settable as shown in FIG. 11. When an "open" button 1101 of FIG. 11 is pressed in this state, the file selection screen shown in FIG. 12 is displayed.

Figure 12:
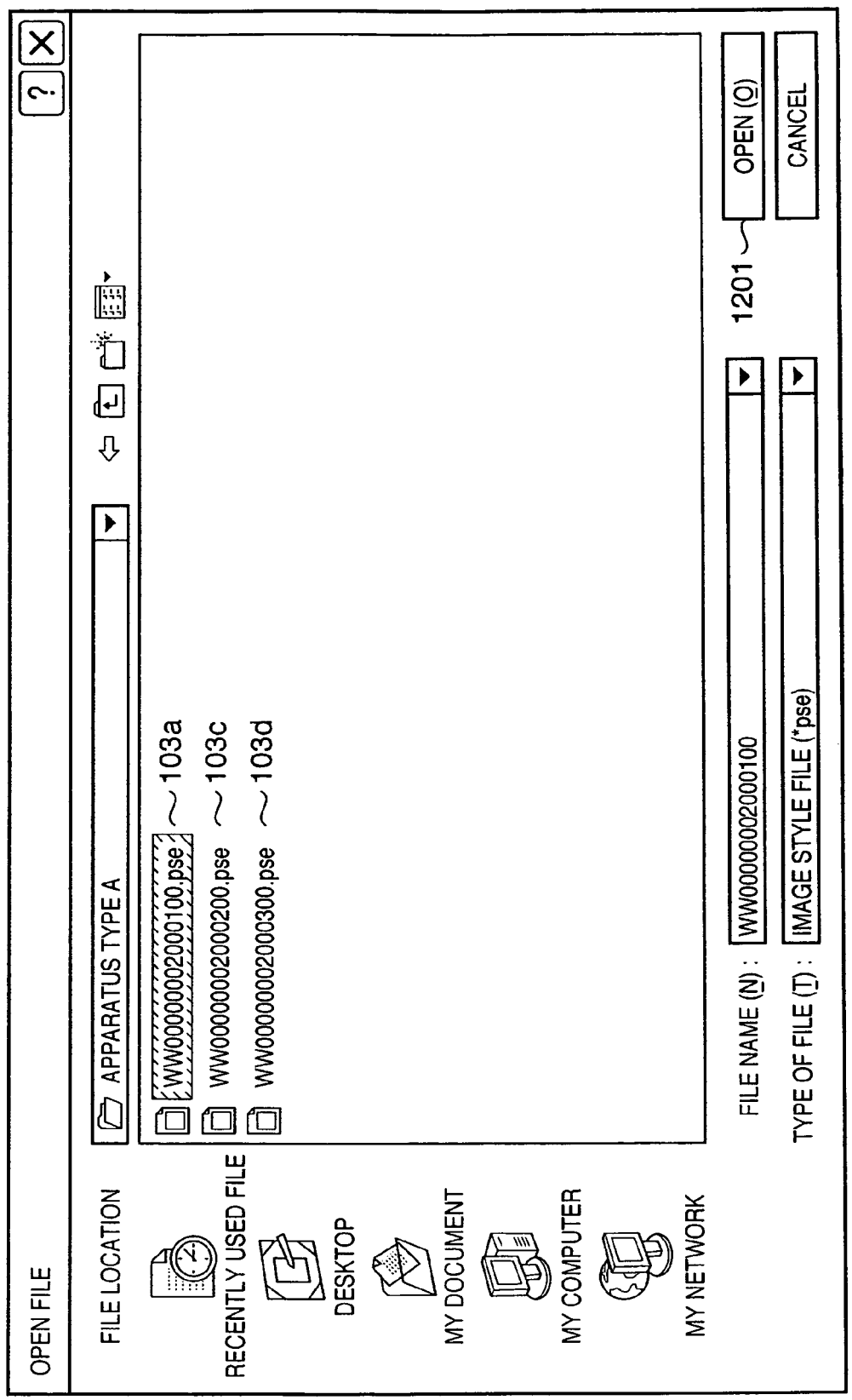
FIG. 12 shows an example of an image processing parameter file selection screen by the setting application 101*b* in the first and second embodiments.

In FIG. 12, three files: the image processing parameter file 103a for the nostalgia mode for apparatus type A, the image processing parameter file 103c for the clear mode for apparatus type A and the image processing parameter file 103d for the clear mode for apparatus type B are displayed. The case where the image processing parameter file 103a for the nostalgia mode is selected will be described.

When an "open" button 1201 is pressed after the image processing parameter file 103a is selected, data of the image processing parameter file 103a is read from the external storage apparatus 504 (steps S202 and S203). Next, the PC 101 checks whether apparatus type information 205 included in the read data corresponds to the apparatus type of the imaging apparatus connected to the PC 101 (step S204). If the former does not correspond to the latter, a warning indicating this fact is displayed on the display 505, and display returns to the file selection screen (step S205).

Figure 13:
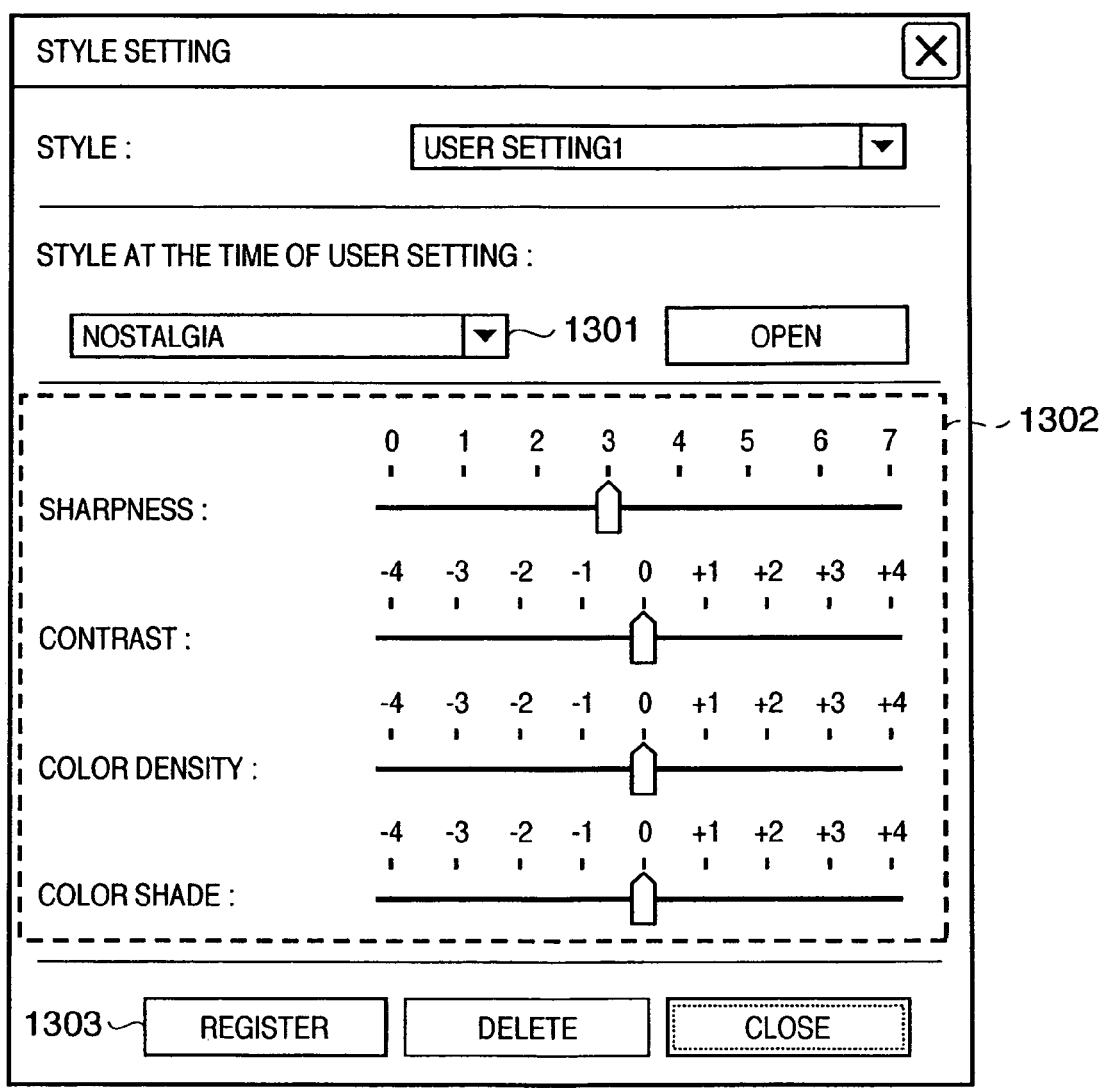
FIG. 13 shows a specific display screen of the setting application 101*b* in the first and second embodiments.

If it is determined that the apparatus type information corresponds the apparatus type of the imaging apparatus at step S204, the style name 204 is extracted from the read data, and displayed on a box 1301 of FIG. 13 (step S206).

In this embodiment, adjustment parameters for desirably adjusting the sharpness, the contrast, the color density, the color shade and the like can be set together with high-order matrix coefficients when the style is set. Thus, when the style is set in the imaging apparatus, these parameters can be set from a user interface shown by reference numeral 1302 in FIG. 13 (step S207). The sharpness may be set within the range of 0 to 7, and the contrast, the color density and the color shade may be set within the range of −4 to +4.

When the settings described above are all completed, the user presses a "registration" button 1303 of FIG. 13. When depression of the registration button 1303 is detected, the PC 101 decodes data in the image processing parameter file as required as described previously with FIG. 3 (steps S208 and S209). The decoded data is transferred to the imaging apparatus 104 (step S210). In this example, the higher-order matrix coefficient 201, the adjustment parameter 202 and the style name 204 are transferred to the imaging apparatus 104. In this embodiment, data is decoded in the PC 101, but data may be decoded in the imaging apparatus 104 after transferring data to the imaging apparatus 104.

The high-order matrix coefficient and the adjustment parameter transferred from the PC 101 in the manner described above are matched with the style name transferred at the same time, and stored in the memory 9. In this way, processing of registering the image processing parameter in the imaging apparatus 104 by the downloaded imaging processing parameter file is completed. In the imaging apparatus 104, as described above, the three-dimensional lookup table 7e is generated and set based on the high-order matrix coefficient corresponding to the specified photographing mode (style name), and the adjustment parameter corresponding to the specified photographing mode is set in the image processing portion 7b.

Figure 14:
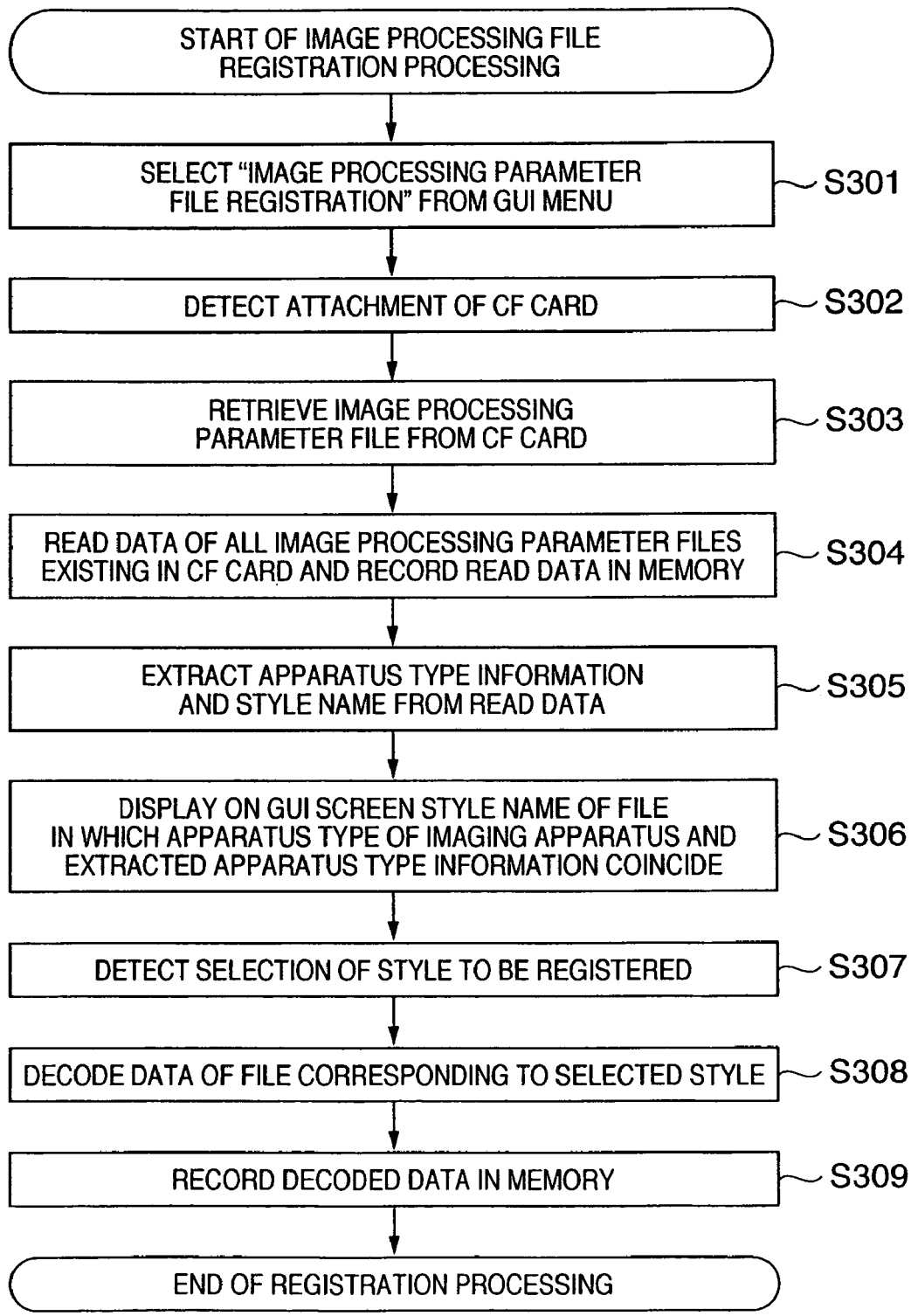
FIG. 14 is a flowchart showing a method for setting the image processing parameter file using a recording medium detachably attachable to the imaging apparatus 104 in the first embodiment.

The method for setting the image processing parameter file using the setting application 101b for setting the image processing parameter in the imaging apparatus has been described above. A method for setting the image processing parameter using a memory card (external memory 14), such as a CF card or a SD card, detachably attachable to the imaging apparatus 104 without using the setting application 101b will be described. In this embodiment, the CF card is used as the external memory 14 detachably attachable to the imaging apparatus 104. FIG. 14 is a flowchart explaining processing in which the imaging apparatus registers style data from the image processing parameter file recorded in the CF card.

First, the user records in the CF card an image processing parameter file desired to be set in the imaging apparatus 104 in advance, and attaches the CF card to the imaging apparatus 104. The recording of the image processing parameter file in the CF card is performed by, for example, recording in the CF card the image processing parameter file acquired via the internet 102 from the center server 103 by the PC 101.

The imaging apparatus 104 has the display portion 21 such as a TFT, and various menus of a GUI (Graphical User Interface) can be displayed on the display portion 21. Various settings for the imaging apparatus 104 can be made using the operation portion 22 provided in the imaging apparatus 104. When detecting selection by a user of "imaging processing parameter file registration", i.e., one of the GUI menus (step S301), the imaging apparatus 104 detects attachment of the CF card (step S302). When attachment of the CF card is detected, image processing parameter files are retrieved from the CF card (step S303). Data of all image processing parameter files existing in the CF card is read, and recorded in the memory 9 in the imaging apparatus on a temporary basis (step S304).

Next, the apparatus type information 205 and the file name 204 are extracted from the read data (step S305). Style names of image processing parameter files for which the apparatus type of the imaging apparatus 104 and the read apparatus type information 205 coincides are displayed on a GUI screen (step S306). At this time, if no image processing parameter file can be displayed, a warning of "a relevant image processing parameter does not exist" is displayed on the display portion 21, and the processing is ended.

The user can select a desired image style to be registered from the style names displayed on the GUI at step S306. The imaging apparatus 104 detects the style selected by the user on the GUI (step S307). The imaging apparatus 104 decodes data (high-order matrix coefficients and adjustment parameters) of an image processing parameter file corresponding to the selected style name using the method described previously with FIG. 3 (step S308). The decoded data is matched with the style name and recorded in the memory 9 in the imaging apparatus (step 1209). Thus, image processing parameter file registration processing is completed.

The method for registering the image processing parameter file in the imaging apparatus has been described above. A method for using in the imaging apparatus the image style registered in FIG. 8 or FIG. 14 described above will be described below.

Figure 15A:
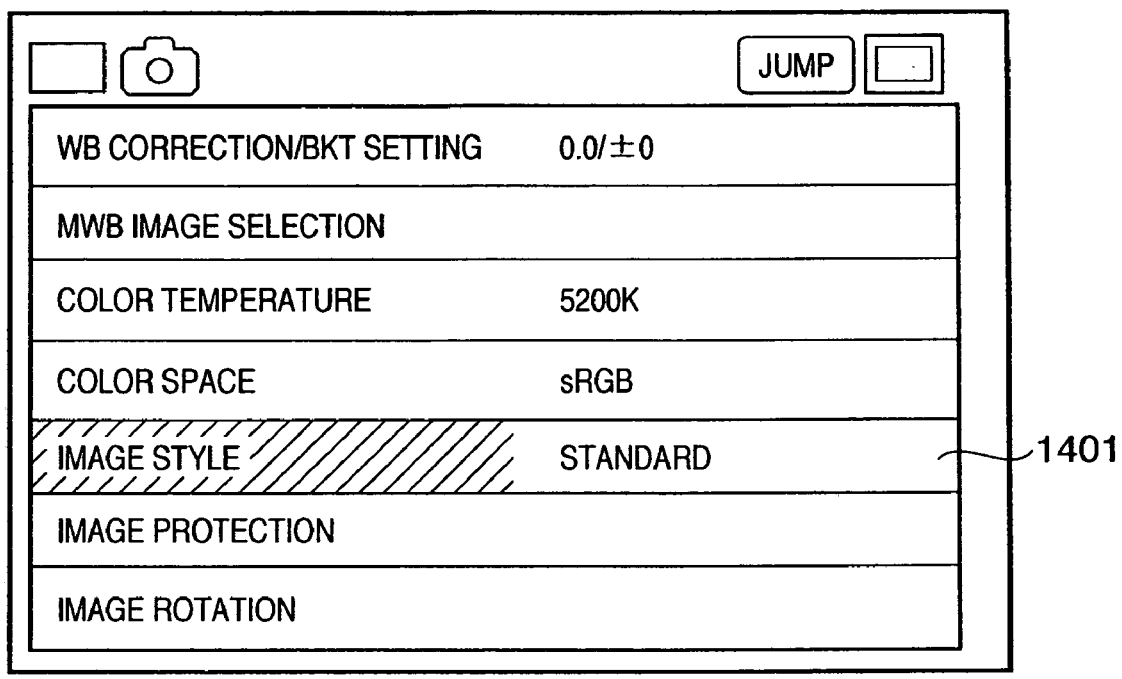
FIG. 15A shows an example of a GUI (Graphical User Interface) menu of the imaging apparatus 104.
Figure 15B:
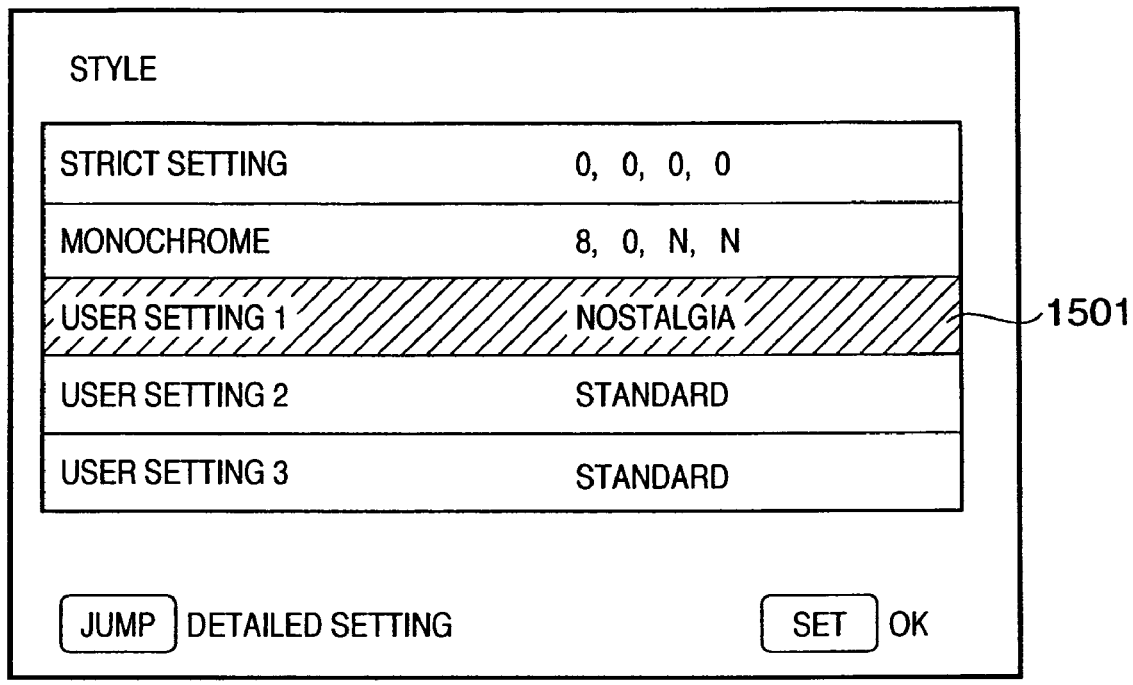
FIG. 15B shows an image style detailed setting screen of the GUI menu of the imaging apparatus 104.

FIG. 15A shows an example of a GUI menu presented on the display portion 21 of the imaging apparatus 104. Reference numeral 1401 in FIG. 15A denotes a style setting menu, where a mode of a style currently set is displayed. In FIG. 15A, "standard", which is a style originally provided as a standard in the imaging apparatus, is currently selected. If a style setting menu 1401 is selected, the screen is changed to a style detailed setting screen shown in FIG. 15B. If "nostalgia" 1501 registered in the item of the aforementioned user setting 1 is selected from the style detailed setting screen and set, an image developed in this style is output in subsequent photographing. Namely, an image processed by the three-dimensional lookup table by high-order matrix coefficients and adjustment parameters registered for this style is output. In the imaging apparatus, the image developed in a style set at the time of taking a photograph is a JPEG-compressed image. In a header of the JPEG-compressed image thus photographed, the style name and the like set at the time of taking a photograph are stored.

Figure 16:
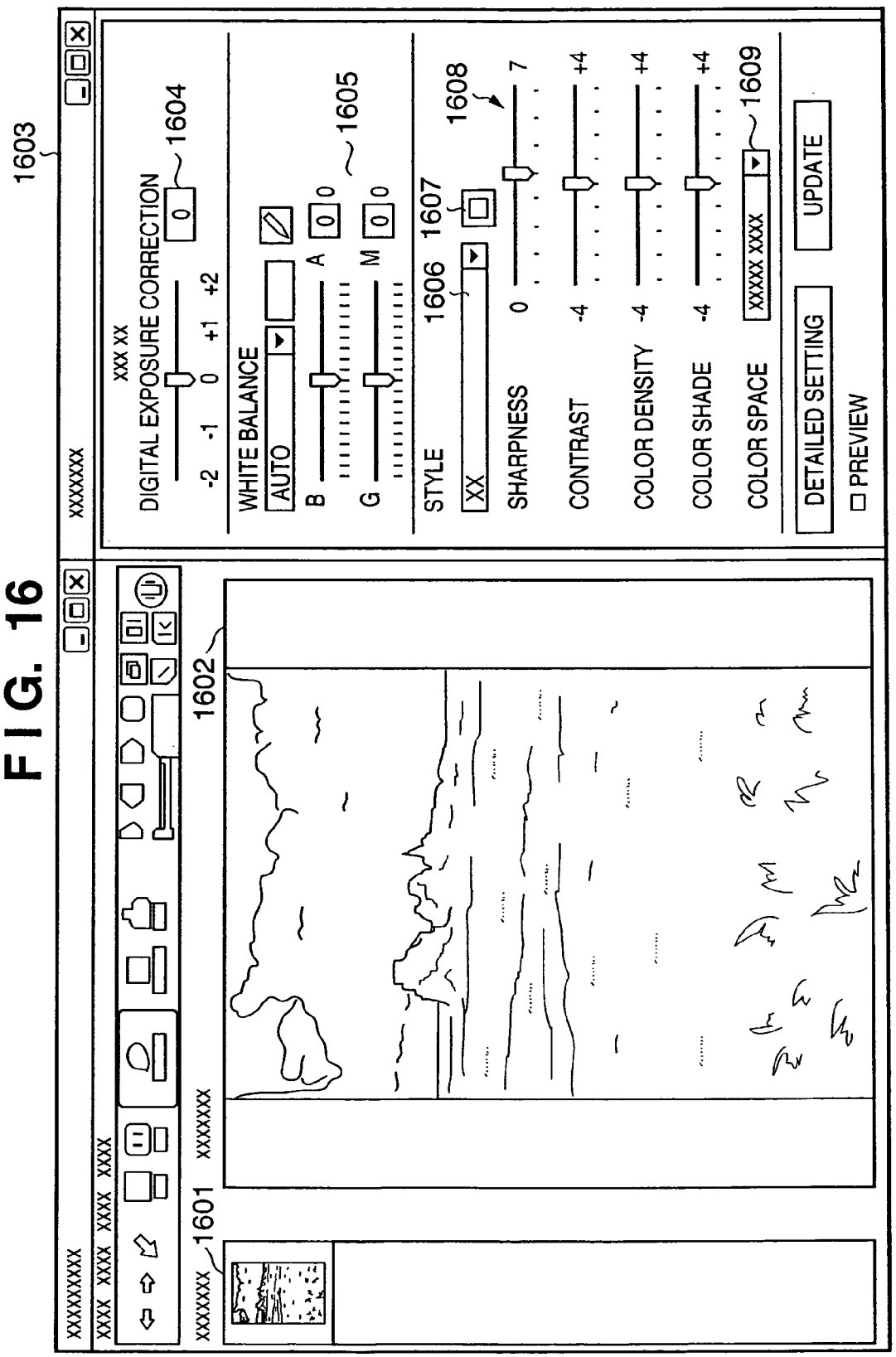
FIG. 16 shows an example of display of a screen by a development application 101*a* in the first and second embodiments.

Processing of setting an image processing parameter in the development application 101a installed in the PC 101 will now be described. The functional configuration of the development application 101a is as described above with FIG. 6. FIG. 16 shows one example of a user interface presented on the display 505 by the development application 101a.

In FIG. 16, a list region 1601 is a region for displaying a list of previously selected images to be subjected to development processing. FIG. 16 shows a situation in which one image is displayed on the region 1601, but it is obvious that a plurality of images can be displayed.

An edit image display region 1602 is a region for displaying one image selected from the list region 1601. The user performs edits such as setting of white balance and a style while viewing the image displayed on the edit image display region 1602.

A menu screen 1603 is a screen providing a menu for performing edits of items such as the exposure correction, the white balance, the image style and the color space for the image displayed on the edit image display region 1602. Items changed using the menu screen 1603 are reflected in the image displayed on the edit image display region 1602 immediately thereafter (subjected to development processing for preview). Therefore, the user can perform edits of these items while checking the finished state of the image. In the development processing for preview, processing taking much time, such as pseudo color reduction processing, is not carried out so that the speed is enhanced.

Reference numeral 1604 denotes a setting menu for digital exposure correction, which allows the brightness of the image to be freely changed in steps of 0.1 stages within the range of −2 stage to +2 stage. Reference numeral 1605 denotes a menu for setting the white balance. In FIG. 16, the automatic mode is selected for white balance, but alternatively, various white valance modes such as sunlight, sun shadow, and tungsten may be selected. Reference numeral 1606 denotes a style selection menu, which allows a desired style to be selected from, for example, the aforementioned standard, portrait, landscape, neutral, strict setting, monochrome and user settings 1 to 3. Reference numeral 1607 denotes an image processing parameter file selection button. By pressing down this selection button 1607, the image processing parameter file is reflected in the image. Detailed operations will be described later. Reference numeral 1608 is a menu for performing edits of the sharpness, contrast, color density and color shade of the image. The sharpness can be set in 8 stages of 0 to 7, and other items can be set in 9 stages of −4 to +4. Reference numeral 1609 denotes a setting screen for the color space, and in this example, sRGB or AdobeRGB can be selected.

Figure 17:
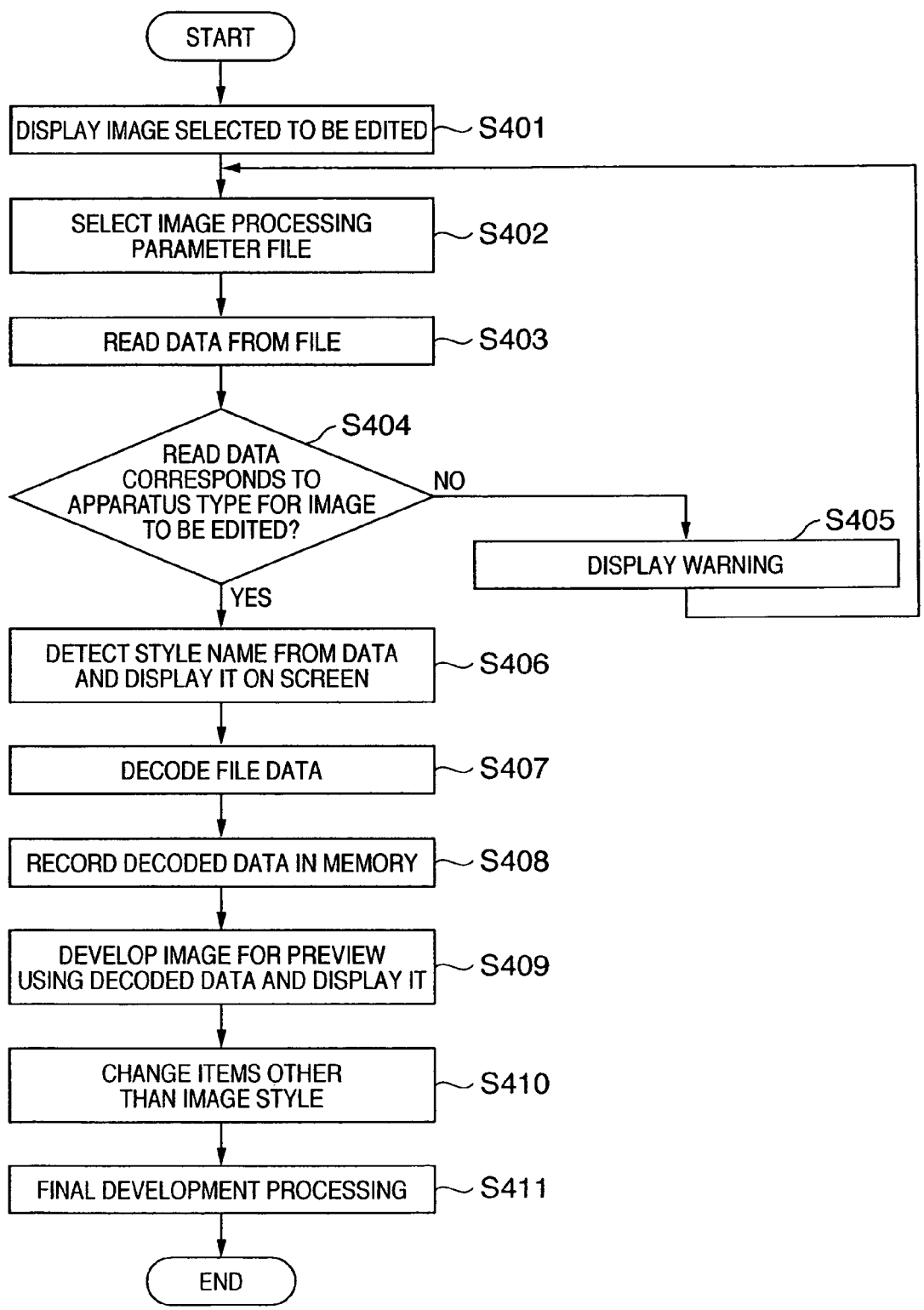
FIG. 17 is a flowchart showing a method for applying the image processing parameter file to an image developed by the development application 101*a* in the first embodiment.

The user interface of the development application 101a has been described above. A method for applying a downloaded image processing parameter file to an image which is developed by the development application 101a will now be described using the flowchart of FIG. 17.

Figure 18:
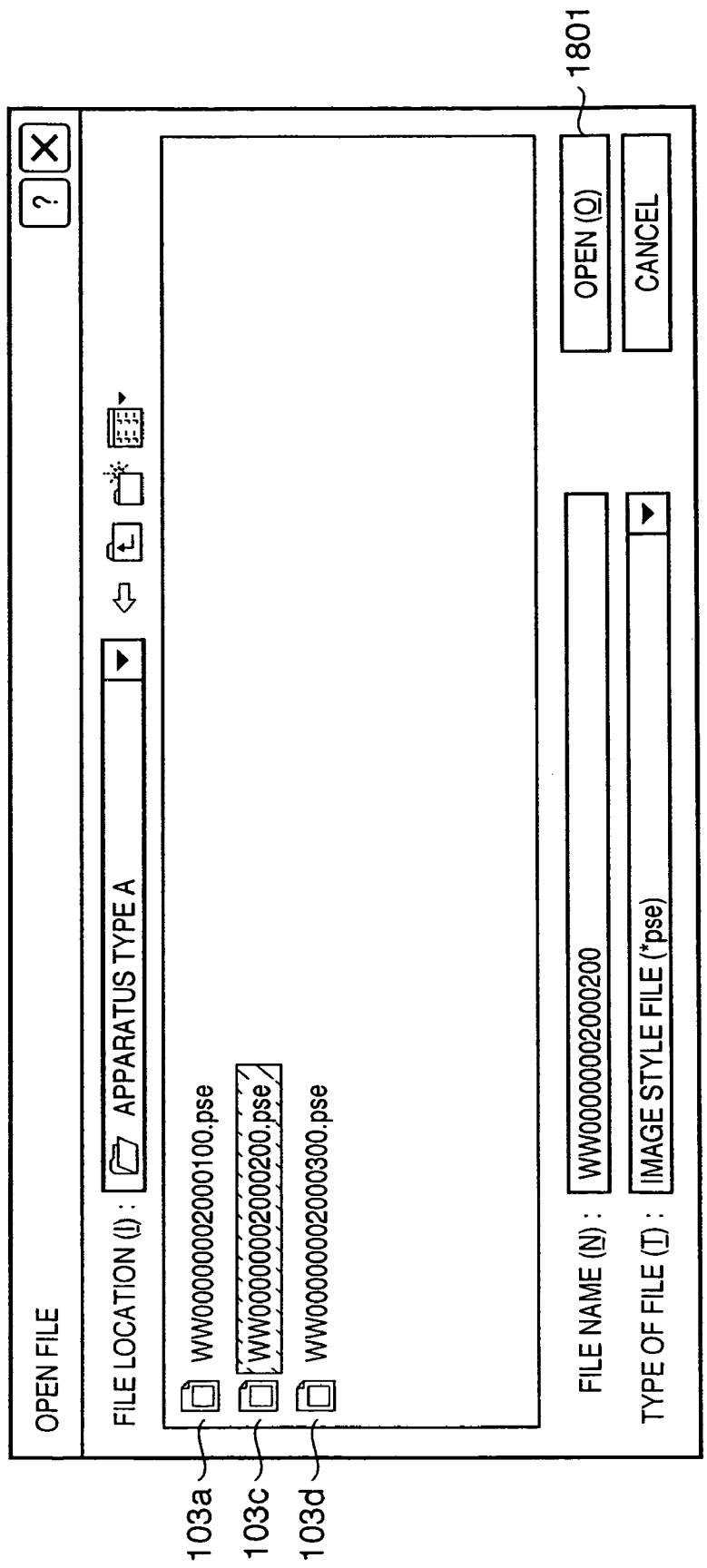
FIG. 18 shows one example of an image processing parameter file selection screen of the development application 101a in the first embodiment.

When the user selects an image desired to be edited from images displayed on the list region 1601, the development application 101a displays the selected image on the edit image display region 1602 (step S401). The RAW image file in this embodiment includes RAW image data and JPEG image data obtained by subjecting the RAW image data to development/JPEG compression, and in this stage, JPEG image data is used for displaying the image on the edit image display region 1602. Next, the user is made to select the image processing parameter file to be applied (step S402). In this embodiment, when the image processing parameter file selection button 1607 is pressed, an image style selection screen shown in FIG. 18 is displayed. In FIG. 18, three files: the image processing parameter file 103a for nostalgia for apparatus type A, the image processing parameter file 103c for clear for apparatus type A and the image processing parameter file 103d for clear for apparatus type B are displayed. The case where the image processing parameter file 103c for clear for apparatus type A is selected will be described below.

When the image processing parameter file 103c is specified and an "open" button 1801 is pressed, the image processing parameter file 103c is selected, and data of the file is read in the development application 101a (steps S402 and S403).

Apparatus type information 205 is acquired from the read data, and compared with apparatus type information (apparatus type information of the imaging apparatus photographing the image) recorded in the RAW image file to be edited (step S404). As a result of this comparison, if the read image processing parameter file does not correspond to the apparatus type for the image to be edited, a warning indicating this fact is displayed on the screen, and display returns to the file selection screen (step S405).

If the image processing parameter corresponds to the apparatus type for the image to be edited, the style name 204 is extracted from data of the image processing parameter file, and the name is displayed on the menu 1606 of FIG. 16 (step S406). Data (high-order matrix coefficient 201 and adjustment parameter 202) of the image processing parameter file is decoded (step S407), and stored in the memory (RAM 53) of the PC 101 (step S408). The matrix acquiring portion 601 (FIG. 6) acquires the decoded high-order matrix coefficient in the manner described above. The expanding portion 602 generates data of lattice points of the three-dimensional lookup table 620 from the acquired high-order matrix coefficient. The adjustment parameter acquiring portion 603 sets the aforementioned decoded adjustment parameter on the image processing portion 612.

Next, using this data, the image to be edited, displayed on the edit image display region 1602, is edited, and preview display for checking the set edit result is provided (step S409). Edits of items such as the aforementioned digital exposure correction, the white balance, the sharpness, the contrast, the color density, the color shade and the color space are performed as required for the image in which the image processing parameter file is thus reflected (step S410).

When edits of all items are completed, a final development processing menu (not shown) is selected, and an image subjected to final development processing is output to complete processing. In this final development processing, processing taking much time, such as pseudo color reduction processing, which is omitted in development processing for preview, is carried out, and an image equivalent to that developed in the imaging apparatus 104 is output (step S411). Here, a warning is given if the parameter file specified by the user does not correspond to the apparatus type, but a determination may be made on the PC side by apparatus type information read from the RAW image file in advance and only a parameter file corresponding to the apparatus type may be displayed.

In the case of the development application, not only apparatus type information of the imaging apparatus but also the correspondence between the parameter file and the version information of the application may be determined. In this case, a setting is made if it is determined that apparatus type information of the parameter file corresponds to version information of the application.

Second Embodiment

In the first embodiment, the case of preparation of the image processing parameter file for each apparatus type has been described. In a second embodiment, the case where the image processing parameter file is not divided for each apparatus type, but is united will be described.

Figure 19:
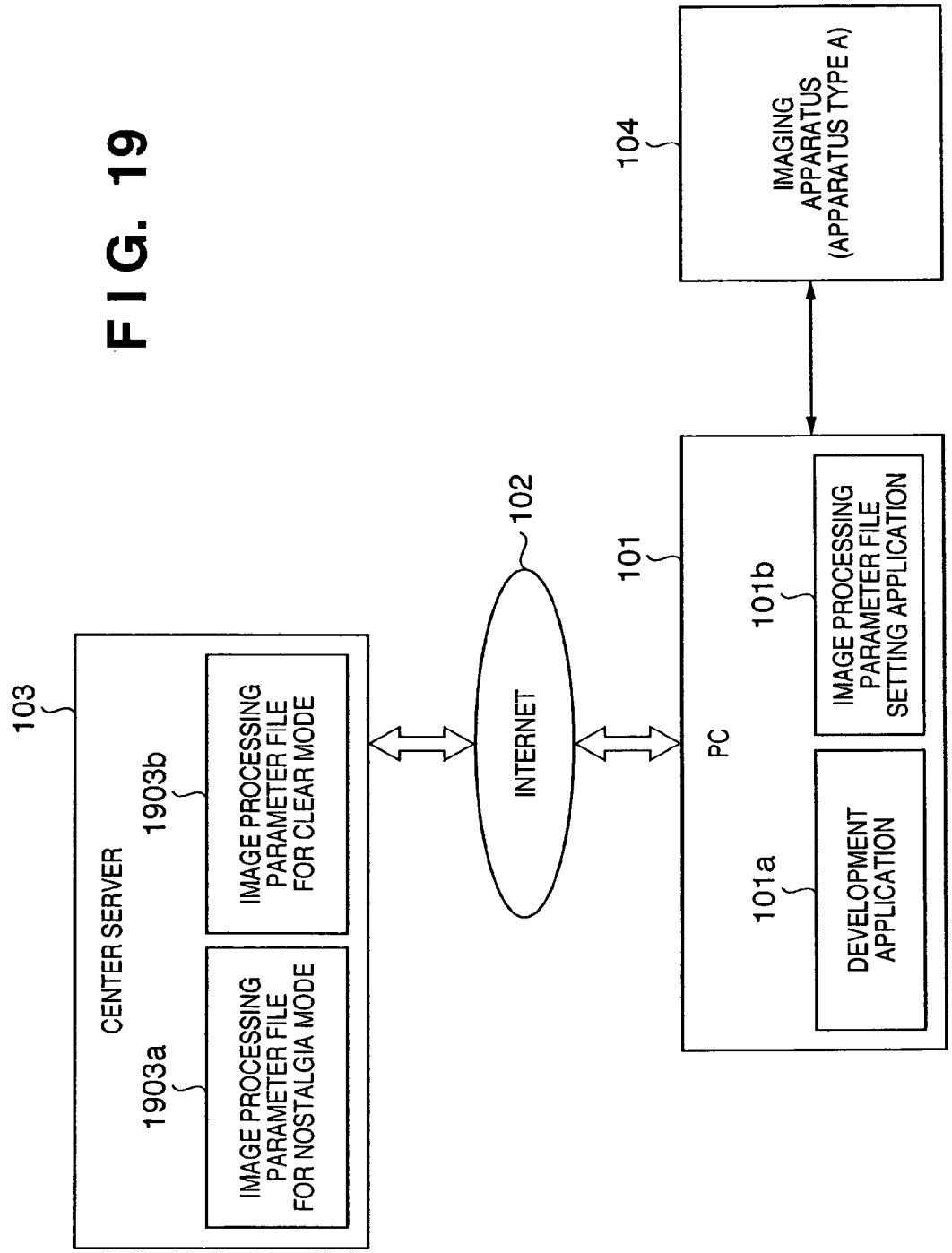
FIG. 19 shows an outline of an image processing file setting system in the second embodiment.

FIG. 19 shows an outline of an image processing file setting system in the second embodiment according to the present invention.

In FIG. 19, the configuration of the image processing file setting system is similar to that shown in the first embodiment (FIG. 1). It is different from the configuration in FIG. 1 in that image processing parameter files prepared in the center server 103 are not discriminated for each apparatus type. Reference numerals 1903a and 1903b denote image processing parameter files corresponding to the nostalgia mode and the clear mode described in the first embodiment, respectively, but data for a plurality of apparatus types is united. Namely, the user can download the image processing parameter file without discriminating the apparatus type.

Figure 20:
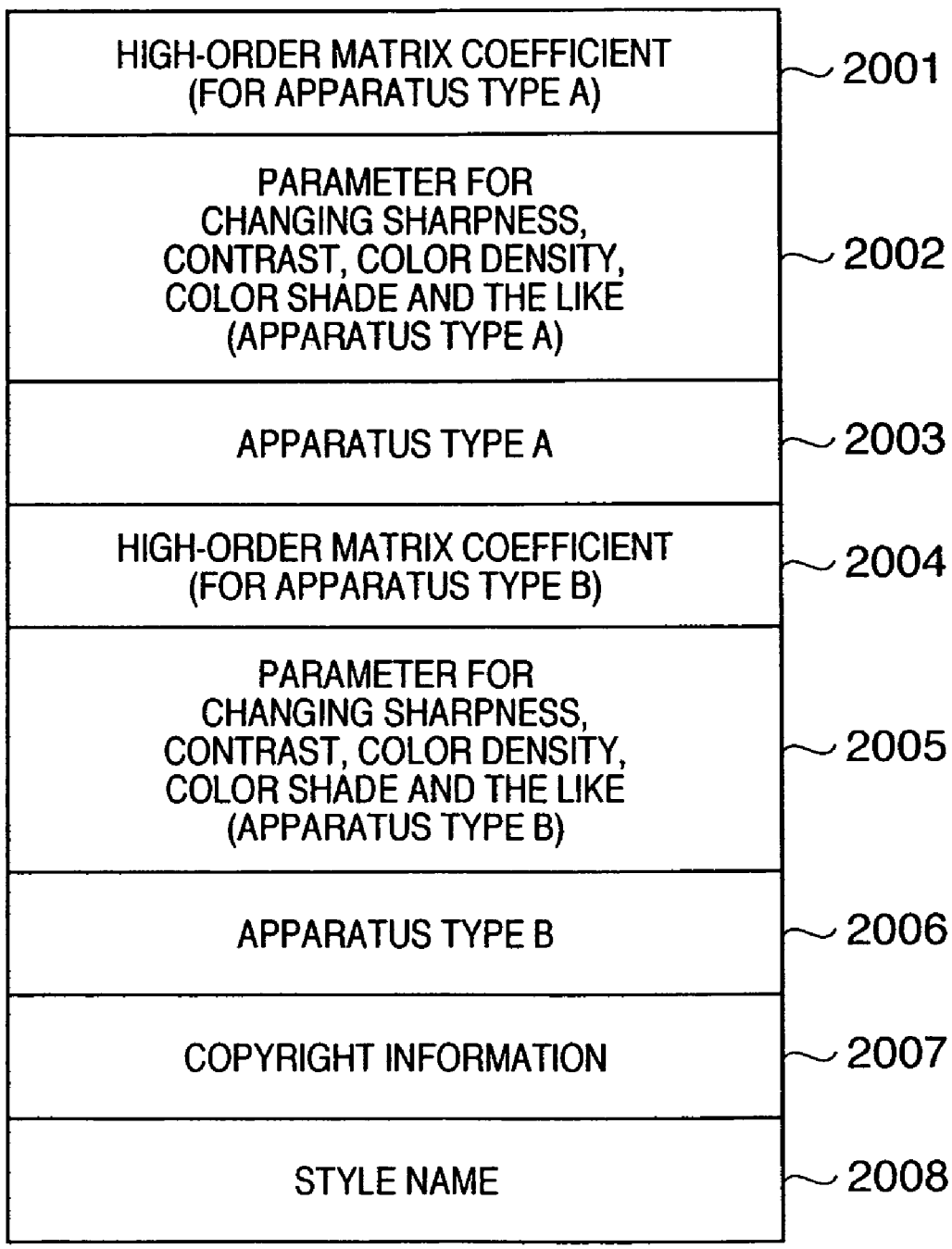
FIG. 20 shows one example of a data structure of an image processing parameter file in the second embodiment.

The details of contents of the image processing parameter file will now be described. FIG. 20 shows an example of a data structure of the image processing parameter file according to the second embodiment. As shown in FIG. 20, the image processing parameter file includes high-order matrix coefficients 2001 for carrying out image processing corresponding to the apparatus type A of imaging apparatus. As in the first embodiment, information of the three-dimensional LUT (lookup table) may be stored instead of high-order matrix coefficients. The image processing parameter file also includes adjustment parameters 2002 corresponding to the apparatus type A and intended for finely adjusting image processing, such as the sharpness, the contrast, the color density and the color shade, in the imaging apparatus 104 and the development application 104a. Apparatus type information 2003 shows that the aforementioned high-order matrix coefficient 2001 and adjustment parameter 2002 correspond to the apparatus type A.

Similarly, the image processing parameter file also includes high-order matrix coefficients 2003 and adjustment parameters 2005 for finely adjusting the sharpness, the contrast, the color density and the color shade which correspond to the apparatus type B, and apparatus type information 2006.

In the embodiment shown in FIG. 20, the configuration of the image processing parameter file corresponding to two apparatus types: the type A and the type B, but the type and number of apparatuses recorded in the file are not limited. Each time an apparatus type is added, high-order matrix coefficients, and adjustment parameters for finely adjusting the sharpness, the contrast, the color density and the color shade are prepared for each apparatus type.

Further, in the image processing parameter file, copyright information 2007 and style names 2008 are prepared as in the first embodiment.

As described in the first embodiment, parameters involved in image processing, such as the high-order matrix coefficients 2001, 2004, and the adjustment parameters 2002, 2005, in the image processing parameter file of FIG. 20 are all encoded. For method for encoding and decoding, for example, methods shown in the first embodiment (FIG. 3), and the like, are used. Of course, the entire image processing parameter file may be encoded.

Figure 21:
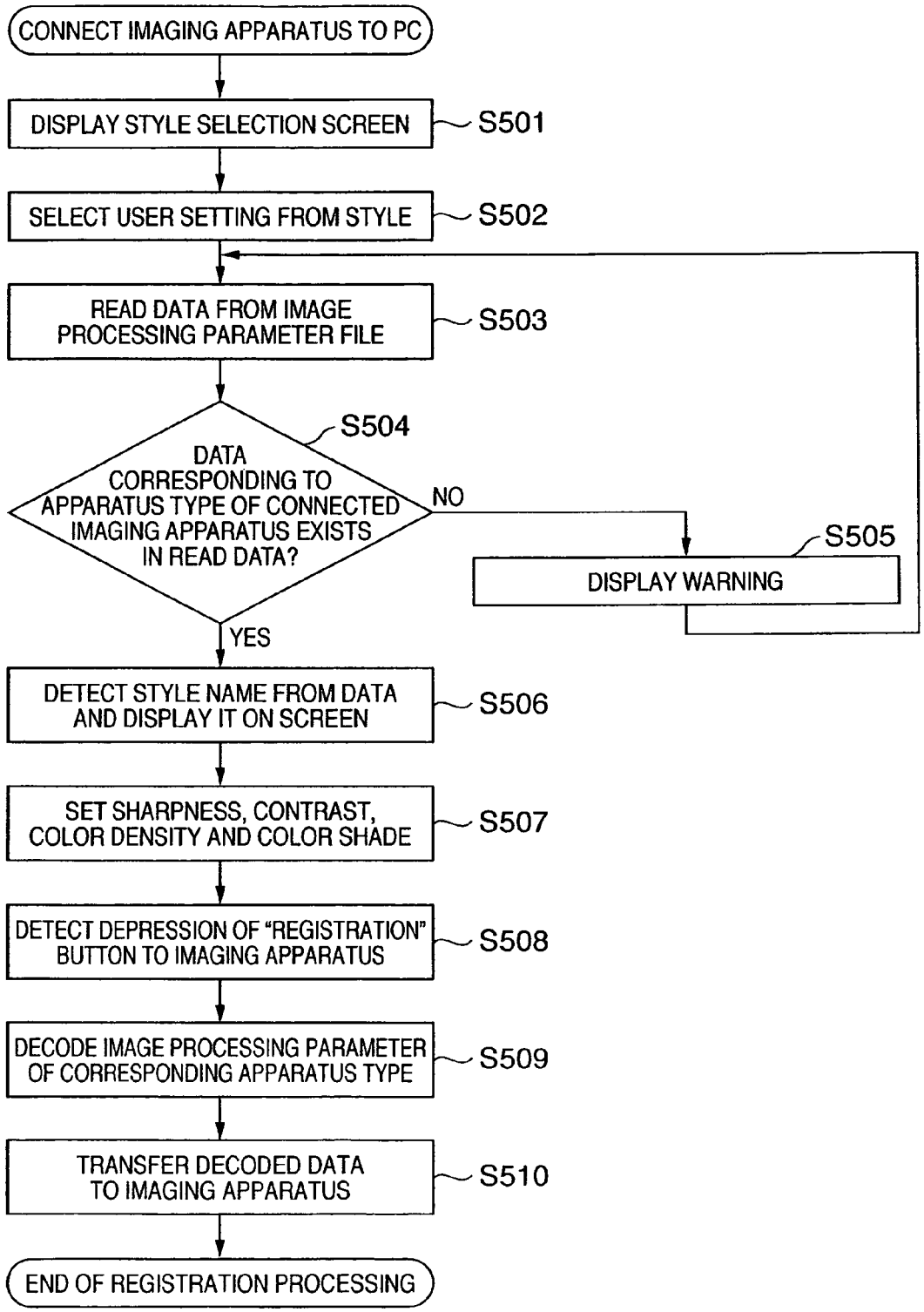
FIG. 21 is a flowchart showing a method for registering the image processing parameter file in the imaging apparatus using application software 101b in the second embodiment.

A method for registering in the imaging apparatus an image processing parameter file downloaded from the center server 103 to the PC 101 by viewing an image processing parameter file downloading Web page (not shown) by a WEB browser and storing the page, using the setting application 101b will now be described using the flowchart of FIG. 21.

First, when the imaging apparatus 104 is connected to the PC 101 via a communication cable such as a USB (communication I/F 20, I/F 507), the setting application 101b is started in the PC 101. The setting application 101b first displays a style selection screen shown in FIG. 9 (step S501). As described in the first embodiment (S202 and S203 in FIG. 8), the user can select a desired style by a user interface shown in FIGS. 9 to 11 (steps S502 and S503).

Figure 22:
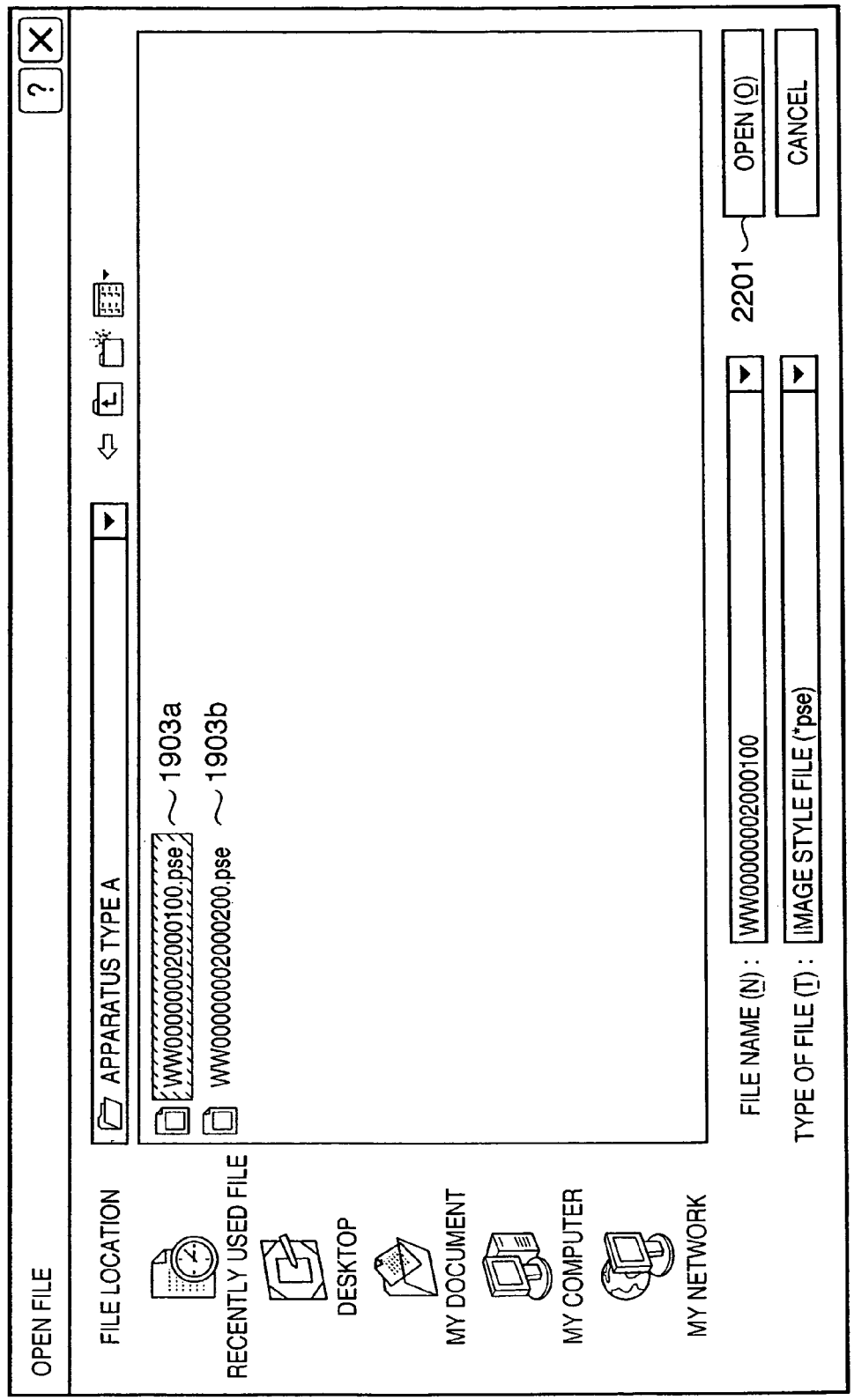
FIG. 22 shows an example of an image processing parameter file selection screen of the setting application 101b in the second embodiment.

In the second embodiment, by pressing down the "open" button 1101 shown in FIG. 11, for example, a screen shown in FIG. 22 is displayed on the display 505. In FIG. 22, two files: the image processing parameter file 1903a for nostalgia and the image processing parameter file 1903b for clear are displayed. The case where the image processing parameter file 1903a for nostalgia is selected will be described below.

When the "open" button 2201 is pressed after the image processing parameter file 1903a is selected, data of the image processing parameter file 1903a is read in the PC 101 (step S503). Apparatus type information 2003, 2006 is detected from the read data, and whether apparatus type information corresponding to the apparatus type of the imaging apparatus 104 currently connected to the PC 101 exists is checked (step S504). If corresponding apparatus type information does not exist, a warning indicating this fact is displayed on the screen, and the display returns to the selection screen (step S505).

If apparatus type information corresponding to the apparatus type of currently connected imaging apparatus exists, the style name 2008 is extracted from the read data, and the name (style names) is displayed on the screen as shown with reference numeral 1301 in FIG. 13 (step S506).

Subsequently, processing at steps S507 to S510 is carried out according to operation and processing procedures similar to those of the first embodiment (S207 to S210 in FIG. 8). In this way, data (high-order matrix coefficients, adjustment parameters and style name) based on the image processing parameter file is registered in the imaging apparatus 104. However, data decoded and transferred at steps S509 and S510 is data corresponding to the apparatus type of the connected imaging apparatus 104, of the selected image processing parameter file.

Figure 23:
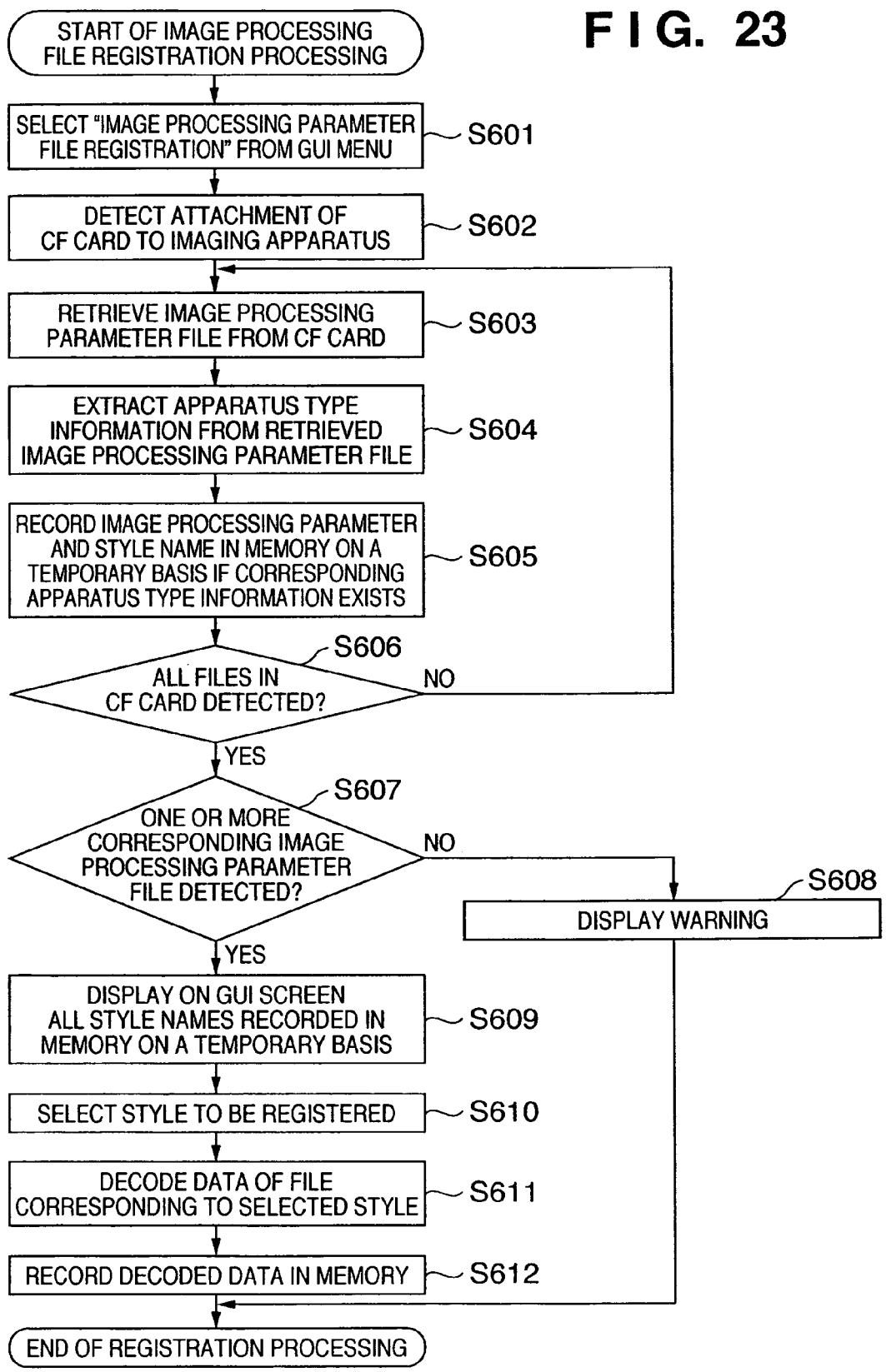
FIG. 23 is a flowchart showing a method for setting the image processing parameter file using a recording medium detachably attachable to the imaging apparatus 104 in the second embodiment.

A method for setting the image processing parameter file using a recording medium (external memory 14) detachably attachable to the imaging apparatus 104, such as a CF card or a SD card without using the setting application 101b will now be described with the flowchart of FIG. 23. In this embodiment, a CF card is used as the external memory 14.

Processing at steps S601 to S603 is similar to processing at steps S301 to S303 in the first embodiment. When the image processing parameter file is retrieved from the CF card at step S603, all pieces of apparatus type information recorded in the image processing parameter file are extracted (step S604). For example, in the case of the data configuration shown in FIG. 20, apparatus type information 2003, 2006 is extracted.

Whether information corresponding to the imaging apparatus 104 exists in the extracted apparatus type information is determined. If corresponding information exists, high-order matrix coefficients and adjustment parameters corresponding to the apparatus type, and the copyright information and style name of the image processing parameter file are recorded in the memory 9 of the imaging apparatus 104 on a temporary basis (step S605).

Whether all image processing parameter files in the attached CF card have been detected is checked, and if other image processing parameter files exist in the CF card, processing returns to step S603, where the aforementioned processing is repeated (step S606). If it is determined that all the files have been detected, processing proceeds to step S607.

At step S607, whether one or more image processing parameter file including data corresponding to the imaging apparatus 104 has been detected is checked (step S607). If no such files have been detected, a display indicating that an image processing parameter file including data corresponding to the imaging apparatus 104 does not exist in the attached CF card is provided on the display portion 21 as a warning (step S608).

If one or more image processing parameter file is detected, all style names recorded in the memory 9 on a temporary basis at step S605 are displayed on the GUI (step S609). Subsequently, at steps S610 to S612, parameters are registered in the imaging apparatus 104 as the user selects an image style desired to be registered in the imaging apparatus from the menu on the GUI. Processing at steps S610 to S612 is similar to steps S307 to S309 described in the first embodiment.

The method for registering the image processing parameter file in the imaging apparatus according to the second embodiment has been described above. The method for using the registered image style in the imaging apparatus is similar to that of the first embodiment, and therefore the description thereof is not presented.

Figure 24:
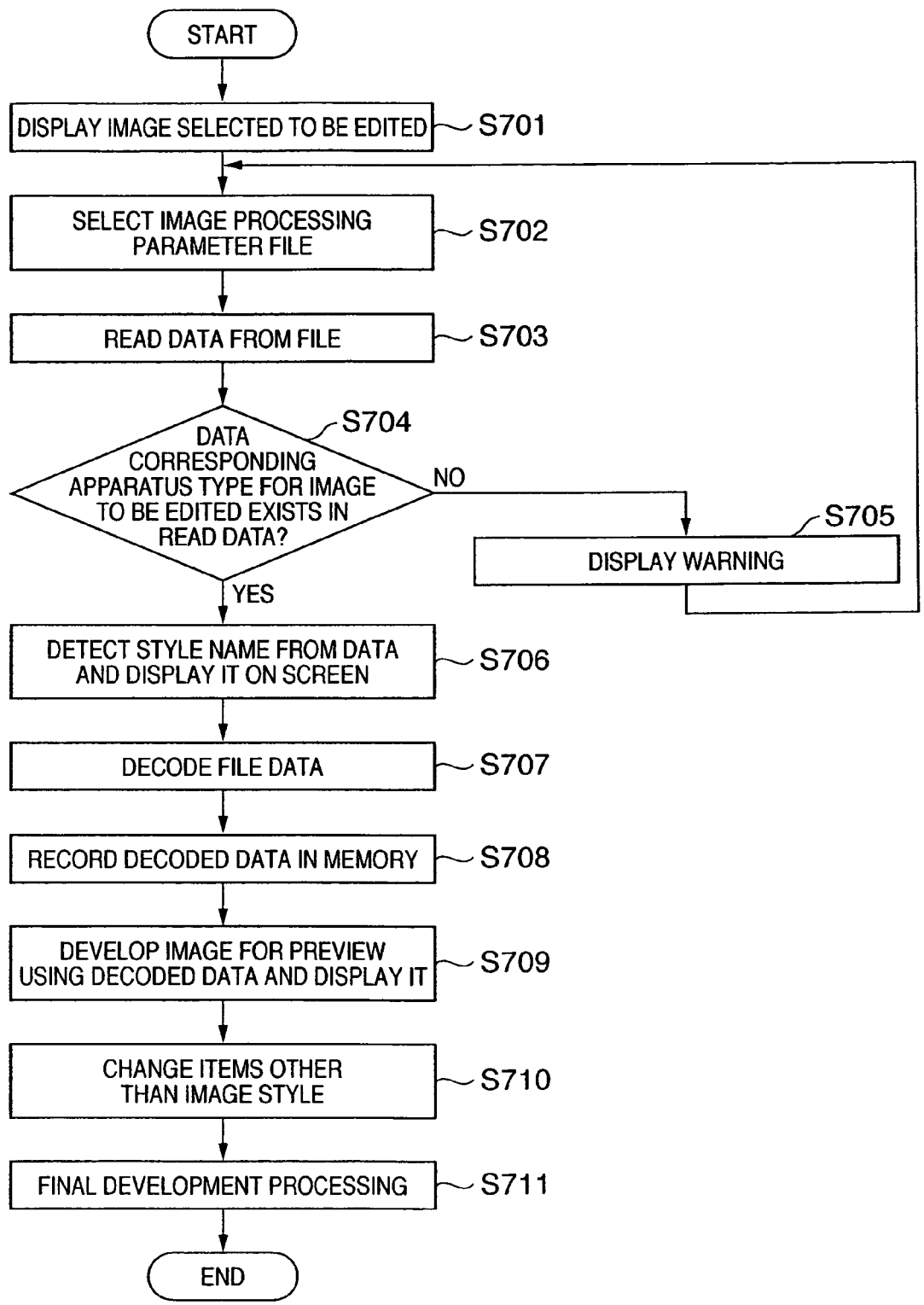
FIG. 24 is a flowchart showing a method for applying the image processing parameter file to an image developed by the development application 101a in the second embodiment.

A method for applying the aforementioned downloaded image processing parameter file to an image developed by the development application software 101a will now be described using the flowchart of FIG. 24. However, the functional configuration of the development application 101a installed in the PC 101 is similar to that of the first embodiment (FIG. 6), and therefore the description thereof is not presented. Processing at steps S701 to S711 shown in FIG. 24 is substantially similar to processing at steps S401 to S411 described in the first embodiment (FIG. 17), and therefore the processing will be described for different points below.

Figure 25:
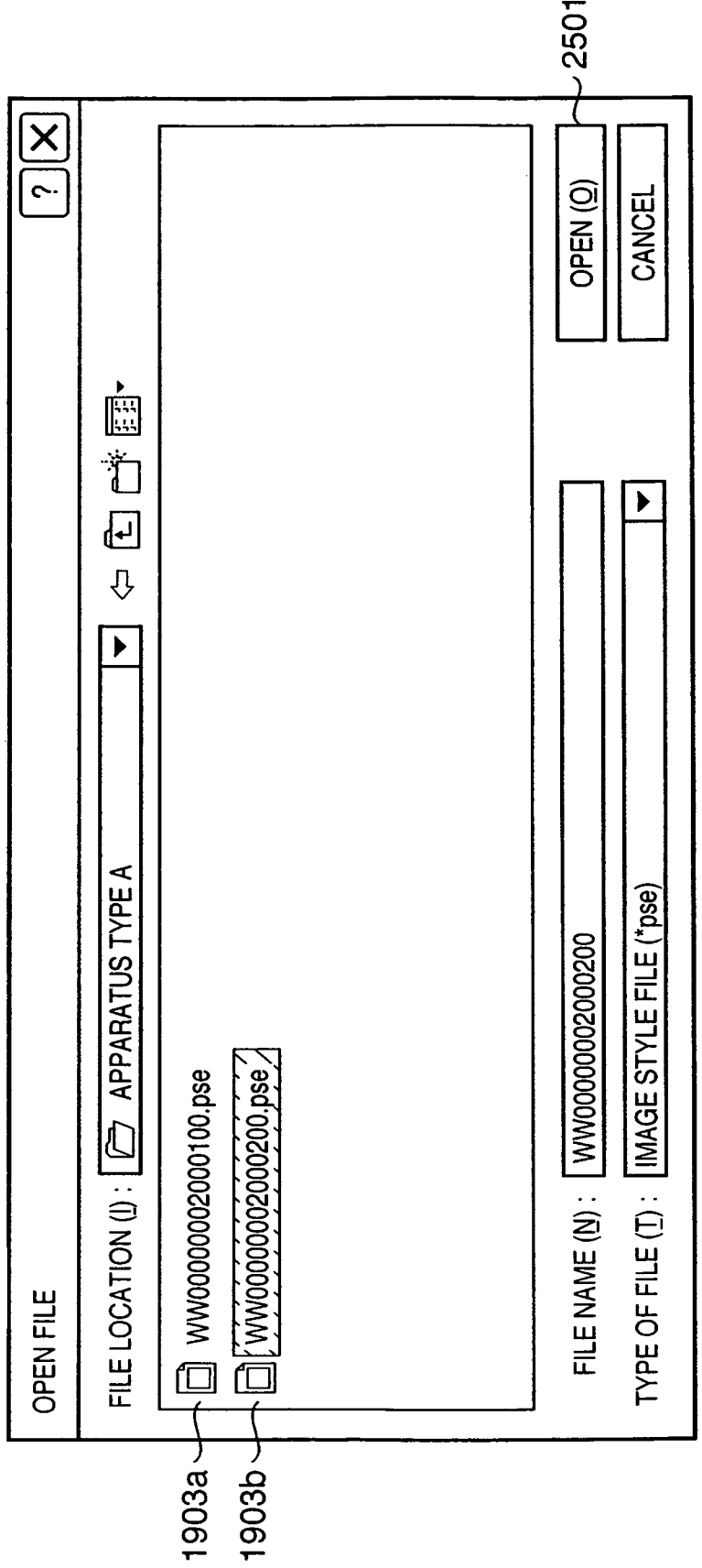
FIG. 25 shows one example of a configuration of an image processing parameter file selection screen of the development application 101a in the second embodiment.

At step S702, when the image processing parameter file selection button 1607 at the user interface shown in FIG. 16 is pressed, a selection screen for the image style shown in FIG. 25 is displayed. In the example of FIG. 25, two image processing parameter files: an image processing parameter file 1703a for nostalgia and an image processing parameter file 1703b for clear are displayed.

At step S704, all pieces of apparatus type information (apparatus type information 2003 and 2006 in the example of FIG. 20) are acquired from the image processing parameter file read by pressing an "open" button 2501, and compared with apparatus type information for an image to be edited (step 2204). At this time, if apparatus type information corresponding to the image to be edited does not exist in apparatus type information of the read image processing parameter file, a warning indicating the fact is displayed on the display 505, and display returns to the file selection screen (step S705). If apparatus type information corresponding to the image to be edited exists, the style name 2008 is extracted from data of the image processing parameter file, and the name is displayed on the menu 1606 of FIG. 16 (step S706). Subsequent processing is similar to that in the first embodiment.

As described above, according to the aforementioned embodiments, the following advantages are obtained.

(1) One image processing parameter file downloaded can be applied to both the imaging apparatus and development application software.

(2) By applying the same image processing parameter files downloaded to the imaging apparatus and development application software, images can be processed with same image processing characteristics in the imaging apparatus and the development application software.

(3) By using a three-dimensional LUT (lookup table) and high-order matrix data which is a base of the three-dimensional LUT, image processing with a high degree of freedom for color reproducibility can be carried out.

(4) Items such as the sharpness, the contrast, the color shade and the color density can be adjusted and registered in the imaging apparatus. Therefore, a desired parameter can be selected from a plurality of patterns having different adjustment specifics in the imaging apparatus or the development application.

(5) Since copyright information is added to the image processing parameter file, the copyright of the file can be certified. Since the name of the image processing mode (style name) is added, the name of the image processing mode (style name) can be displayed in the imaging apparatus and the development application when the parameter is set. By adding apparatus type information of the imaging apparatus corresponding to the image processing parameter file, the corresponding apparatus type of the imaging apparatus can be identified.

(6) By encoding data of the image processing parameter file, the contents of the image processing file can be prevented from being manipulated indiscreetly.

(7) Images can be developed with the contrast, the sharpness, the color shade, the color density and the like changed in the imaging apparatus and the development application in which the image processing parameter file is set.

(8) Since the apparatus type of the imaging apparatus is automatically identified and downloaded, the user is saved from identifying the apparatus type when downloading the file. When the image processing file is set in the imaging apparatus, a wrong operation of setting a file which does not correspond to the imaging apparatus as an image processing file can be prevented.

(10) When the image processing parameter file is set in the development application software, whether the imaging apparatus used in photographing of an image to be edited and the apparatus type for the image processing parameter file coincide is determined. Therefore, a wrong operation of setting a file which does not correspond to the apparatus type used in photographing of an image to be processed by development application software can be prevented.

(11) According to the second embodiment, the image processing file is not divided for each apparatus type, but is united, and therefore when the user downloads the file, it is not necessary to consider the corresponding apparatus type, thus improving the operability.

Other Embodiments

In the embodiments described above, the method in which an image processing parameter file is downloaded from a server using a Web browser in a PC, and set in an imaging apparatus from a hard disk in the PC, and the method in which the downloaded parameter file is stored in an external memory such as a CF card, and the external memory is attached to the imaging apparatus to set the image parameter file have been described.

As another embodiment, the setting application 101*b* may have a Web browser function, whereby the imaging apparatus is connected to the PC to download from the server the image parameter file to the RAM 53 in the imaging apparatus using the setting application, and the extracted parameter is set in the imaging apparatus. Thus, the setting application 101 starting when connecting the imaging apparatus to the PC has a Web browser function, whereby with one setting application, the downloading of the image parameter file and the setting of the image parameter in the imaging apparatus and the development application can collectively be performed.

Figure 26:
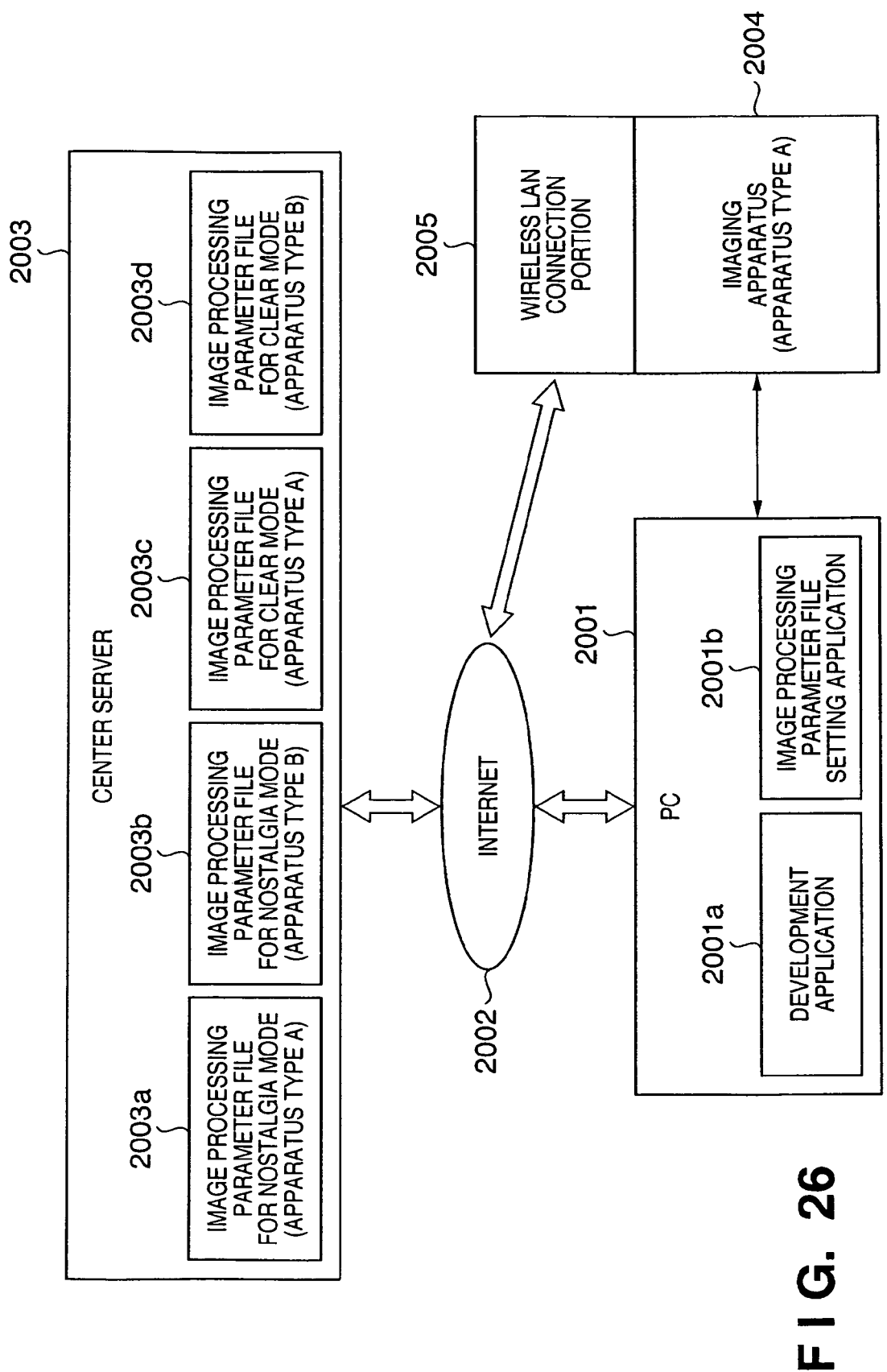
FIG. 26 shows an outline of an image processing file setting system in another embodiment.

As shown in FIG. 26, the imaging apparatus may have a wireless LAN connection function in itself, and directly access the server, whereby the image processing parameter file is downloaded and set in the imaging apparatus. For identification of the apparatus type, the apparatus type may be identified on the server by switching the imaging apparatus to a network communication mode and sending apparatus type information of the imaging apparatus itself to the server. The downloading application stored in the imaging apparatus is started, and the image parameter file is downloaded according to the result of identification. Then, the encoded downloaded file is decoded on the imaging apparatus to automatically set the image parameter file.

In the embodiments described above, only a configuration in which the adjustment parameter 202 is changed in the PC 101 has been described, but the adjustment parameter may be changed in the same manner in the imaging apparatus 104. In this case, various kinds of parameters described with FIG. 9 and the like are adjusted using the display portion 21 and the operation portion 22 provided in the imaging apparatus 104, but specific examples and the like of the user interface are obvious to a person skilled in the art, and therefore the description thereof is not presented.

The embodiments have been described in detail above, but the present invention can take an implementation as, for example, a system, an apparatus, a method, a program, a storage medium or the like. Specifically, the present invention may be applied to a system consisting of a plurality of devices, or may be applied to an apparatus consisting of one device.

The present invention includes the case where a program of software is delivered to a system or apparatus directly or remotely, and a computer of the system or apparatus reads and executes the delivered program code to achieve the function of the embodiment described above. In this case, the program which is delivered is a program corresponding to the flowchart shown in the figure in the embodiment.

Thus, for implementing the functional processing of the present invention with a computer, a program code itself installed in the computer also implements the present invention. Namely, the present invention also includes a computer program itself for implementing the functional processing of the present invention.

In this case, the computer program may a form of an object code, a program executed by an interpreter, script data delivered to the OS, or the like as long as it has a function of a program.

Recording media for delivering the program include the following media. They are, for example, Floppy® disks, hard disks, optical disks, magneto-optical disks, MOs, CD-ROMs, CD-Rs, CD-RWs, magnetic tapes, nonvolatile memory cards, ROMs, DVDs (DVD-ROMs and DVD-Rs) and the like.

As another method for delivering a program, connection to a home page in an internet is established using a browser of a client computer, and the computer program of the present invention is downloaded to a recording medium such as a hard disk from the home page. In this case, the program which is downloaded may be a file compressed and including an automatic installation function. The functional processing can also be implemented by dividing the program code constituting the program of the present invention into a plurality of files, and downloading the files from different home pages. Namely, a WWW server allowing a plurality of users to download a program file for implementing the functional processing of the present invention with a computer is also included in the present invention.

In addition, the program of the present invention may be encoded, stored in a recording medium such as a CD-ROM, and distributed to the user. In this case, a user who has satisfied predetermined conditions may be made to download key information for recovering encodes from a home page via an internet, use the key information to execute an encoded program, and install the program in a computer.

Not only the function of the embodiment described above may be implemented by the read program being executed by the computer, but also the function of the embodiment may be implemented in cooperation with the OS or the like operating on the computer based on instructions from the program. In this case, the OS or the like performs part or all of actual processing, by which the function of the embodiment described above is implemented.

Further, the program read from the recording medium may be written onto a memory provided in a function expansion board inserted in the computer or a function expansion unit connected to the computer to implement part or all of the function of the embodiment described above. In this case, after the program is written onto the function expansion board or the function expansion unit, a CPU or the like provided in the function expansion board or the function expansion unit carries out part or all of actual processing based on instructions from the program.

According to the present invention, an image processing parameter downloaded from an external apparatus can be set in both of an imaging apparatus and a development application.

As many apparently widely different embodiments of the present invention can be made without departing from the spirit and scope thereof, it is to be understood that the invention is not limited to the specific embodiments thereof except as defined in the appended claims.

What is claimed is:

1. A system for setting a parameter for image processing in an imaging apparatus and an information processing apparatus different from said imaging apparatus, comprising:

a downloading unit configured to download a parameter file that corresponds to the apparatus type of said imaging apparatus from an external apparatus that is different from said information processing apparatus and said imaging apparatus when said imaging apparatus and said information processing apparatus are linked;

a setting unit configured to set an image processing parameter for said imaging apparatus, which is included in said parameter file downloaded by said downloading unit;

a first processing unit configured to process image data at said imaging apparatus using the image processing parameter set by said setting unit, a second processing unit configured to process image data at said information processing apparatus using the image processing parameter downloaded by said downloading unit, an instructing unit configured to instruct said setting unit to set an image processing parameter; and a determining unit configured to determine whether the image processing parameter instructed to be set by said instructing unit corresponds to the apparatus type of said imaging apparatus linked with said information processing apparatus, wherein when said determining unit determines that the image processing parameter corresponds to the apparatus type of said imaging apparatus linked with said information processing apparatus, said setting unit operates, and wherein said first and said second processing units perform equivalent processing of an image using the image processing parameter obtained from one parameter file downloaded by said downloading unit.

2. The system according to claim 1, wherein said parameter file includes at least any of a three-dimensional lookup table and a high-order matrix coefficient for generating the three-dimensional lookup table as said image processing parameter.

3. The system according to claim 2, wherein said parameter file further includes a variable parameter for adjusting at least any of a sharpness, a contrast, a color shade and a color density, and the system further comprises an adjustment unit configured to provide a user interface for allowing a user to adjust said variable parameter in said information processing apparatus.

4. The system according to claim 3, wherein said setting unit sets in said imaging apparatus the variable parameter adjusted by said adjustment unit.

5. The system according to claim 1, wherein said parameter file includes an image processing parameter corresponding to one apparatus type and apparatus type information showing the apparatus type, and said setting unit sets the image processing parameter in said imaging apparatus if the apparatus type information of said selected parameter file corresponds to said imaging apparatus, and said setting unit does not set the image processing parameter but outputs a warning if the apparatus type information of said selected parameter file does not correspond to said imaging apparatus.

6. The system according to claim 1, wherein said parameter file includes a plurality of sets of apparatus type information and image processing parameters; and said setting unit extracts an image processing parameter corresponding to apparatus type information corresponding to said imaging apparatus from said selected parameter file and sets the extracted image processing parameter in said imaging apparatus.

7. The system according to claim 6, wherein said setting unit does not set the image processing parameter but outputs a warning if said selected parameter file does not include apparatus type information corresponding to said imaging apparatus.

8. The system according to claim 1, wherein said setting unit sets said image processing parameter in said imaging apparatus via a communication unit configured to connect said information processing apparatus and said imaging apparatus such that they can communicate with each other.

9. The system according to claim 1, further comprising a storage unit configured to store said parameter file downloaded by said downloading unit in a storage medium detachably attachable to said imaging apparatus, wherein said setting unit performs a setting operation via said storage unit.

10. The system according to claim 1, further comprising a storage unit configured to store said parameter file downloaded by said downloading unit in a storage medium included in said imaging apparatus, wherein said setting unit performs a setting operation via said storage unit.

11. The system according to claim 1, further comprising a storage unit configured to store said parameter file downloaded by said downloading unit in a storage medium in said information processing apparatus, wherein said setting unit performs a setting operation via said storage unit.

12. A parameter setting method in a system setting an image processing parameter in an imaging apparatus and an information processing apparatus different from said imaging apparatus, comprising:

- a downloading step of downloading a parameter file that corresponds to the apparatus type of said imaging apparatus from an external apparatus that is different from the information processing apparatus and the imaging apparatus when said imaging apparatus and said information processing apparatus are linked;
- a setting step of setting an image processing parameter for the imaging apparatus, which is included in the parameter file downloaded in said downloading step;
- a first processing step of processing image data at said imaging apparatus using the image processing parameter set in said setting step;
- a second processing step of processing image data at said information processing apparatus using the image processing parameter downloaded in said downloading step;
- an instructing step of instructing the setting of an image processing parameter; and
- a determining step of determining whether the image processing parameter instructed to be set in said instructing step corresponds to the apparatus type of said imaging apparatus linked with said information processing apparatus,
- wherein when said determining step determines that the image processing parameter corresponds to the apparatus type of said imaging apparatus linked with said information processing apparatus, said setting step operates,
- wherein in said first and said second processing steps, equivalent processing of an image is performed using the image processing parameter obtained from one parameter file downloaded in said downloading step.

13. A control program stored on a non-transitory computer-readable medium for making a computer execute the parameter setting method set forth in claim 12.

14. A non-transitory computer readable medium storing the control program set forth in claim 13.

* * * * *